(12) United States Patent
Alsehly et al.

(10) Patent No.: US 9,872,149 B2
(45) Date of Patent: Jan. 16, 2018

(54) METHOD OF ESTIMATING POSITION OF A DEVICE USING GEOGRAPHICAL DESCRIPTIVE DATA

(71) Applicant: SENSEWHERE LIMITED, Edinburgh (GB)

(72) Inventors: Firas Alsehly, Edinburgh (GB); Zankar Upendrakumar Sevak, Edinburgh (GB); Tughrul Sati Arslan, Edinburgh (GB)

(73) Assignee: SENSEWHERE LIMITED, Edinburgh (GB)

(*) Notice: Subject to any disclaimer, the term of this patent is extended or adjusted under 35 U.S.C. 154(b) by 0 days.

(21) Appl. No.: 14/416,897

(22) PCT Filed: Jul. 24, 2013

(86) PCT No.: PCT/GB2013/051985
§ 371 (c)(1),
(2) Date: Jan. 23, 2015

(87) PCT Pub. No.: WO2014/016602
PCT Pub. Date: Jan. 30, 2014

(65) Prior Publication Data
US 2015/0172872 A1 Jun. 18, 2015

Related U.S. Application Data

(60) Provisional application No. 61/676,029, filed on Jul. 26, 2012.

(30) Foreign Application Priority Data

Jul. 24, 2012 (GB) .................................. 1213172.8

(51) Int. Cl.
*H04W 24/00* (2009.01)
*H04W 4/04* (2009.01)
(Continued)

(52) U.S. Cl.
CPC ............ *H04W 4/04* (2013.01); *G01C 21/206* (2013.01); *G01S 5/0236* (2013.01);
(Continued)

(58) Field of Classification Search
None
See application file for complete search history.

(56) References Cited

U.S. PATENT DOCUMENTS 8,200,251 B2   6/2012  Huang
8,700,060 B2   4/2014  Huang
(Continued)

FOREIGN PATENT DOCUMENTS

EP   1 111 951     6/2001
JP   2006-337262   12/2006
(Continued)

OTHER PUBLICATIONS

Ivan Spassov, "Algorithms for Map-Aided Autonomous Indoor Pedestrian Positioning and Navigation", Thesis No. 3961 (2007), presented Nov. 23, 2007 (135 pgs.).
(Continued)

*Primary Examiner* — Idowu O Osifade
(74) *Attorney, Agent, or Firm* — Nixon & Vanderhye P.C.

(57) ABSTRACT

The invention provides a method of estimating the position of a device, the method comprising: providing a database of location specific geographical descriptive data; obtaining location data relating to the position of the device; retrieving geographical descriptive data specific to an indoor region from the said database, the indoor region being selected dependent on the location data; and subsequently estimating the position of the device taking into account the retrieved data. The method can be used with existing or new posi-
(Continued)

tioning systems to improve the execution of the said positioning systems, particularly when the positioning system is being used indoors.

43 Claims, 13 Drawing Sheets

(51) Int. Cl.
  *G01S 5/02* (2010.01)
  *G01C 21/20* (2006.01)
  *H04B 10/114* (2013.01)
  *H04W 4/02* (2009.01)

(52) U.S. Cl.
  CPC .......... *G01S 5/0252* (2013.01); *H04B 10/114* (2013.01); *H04W 4/028* (2013.01)

(56) References Cited

U.S. PATENT DOCUMENTS

| | | |
|---|---|---|
| 2003/0036391 A1 | 2/2003 | Jordan |
| 2004/0258013 A1* | 12/2004 | Belcea .................. G01S 5/0252 370/328 |
| 2008/0303901 A1 | 12/2008 | Variyath et al. |
| 2009/0171571 A1 | 7/2009 | Son et al. |
| 2009/0227266 A1* | 9/2009 | Baik ..................... G01S 5/0294 455/456.1 |
| 2010/0008337 A1 | 1/2010 | Bajko |
| 2010/0250134 A1* | 9/2010 | Bornstein .............. G01C 21/12 701/500 |
| 2010/0324813 A1 | 12/2010 | Sundararajan et al. |
| 2011/0205125 A1 | 8/2011 | Lin et al. |
| 2011/0274000 A1 | 11/2011 | King et al. |
| 2012/0021771 A1* | 1/2012 | Gupta .................... G01C 21/20 455/456.3 |
| 2012/0133555 A1 | 5/2012 | Hyun |
| 2012/0157123 A1 | 6/2012 | Li et al. |

FOREIGN PATENT DOCUMENTS

| | | |
|---|---|---|
| WO | 2009/148767 | 12/2009 |
| WO | 2010/075369 | 7/2010 |
| WO | 2011/047310 | 4/2011 |
| WO | 2011/077166 | 6/2011 |
| WO | 2011/127659 | 10/2011 |
| WO | 2012/082828 | 6/2012 |

OTHER PUBLICATIONS

Leppäkoski et al., "Pedestrian Navigation Based on Inertial Sensors, Indoor Map, and WLAN Signals", Department of Computer Systems, Tampere University of Technology, Tampere, Finland, 2012 (4 pgs.).
Bahl et al., "Radar: An In-Building RF-based User Location and Tracking System", Microsoft Research, IEEE Infocom 2000 (10 pgs.).
Kushki et al., "Intelligent Dynamic Radio Tracking in Indoor Wireless Local Area Networks", IEEE Transactions on Mobile Computing, vol. 9, No. 3, Mar. 2010 (15 pgs.).
International Search Report for PCT/GB2013/051985, dated Nov. 5, 2013, two pages.

* cited by examiner

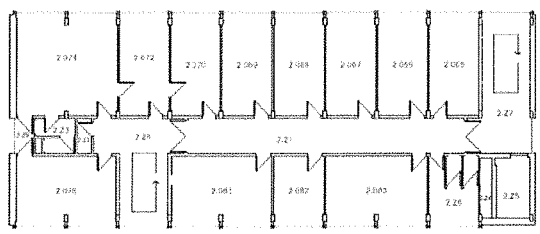
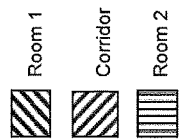
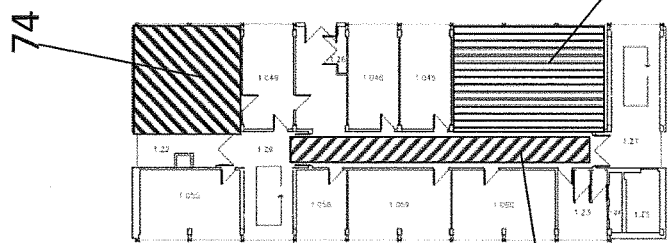
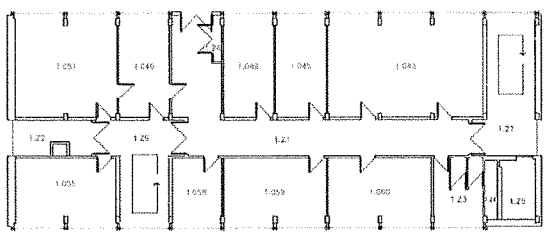

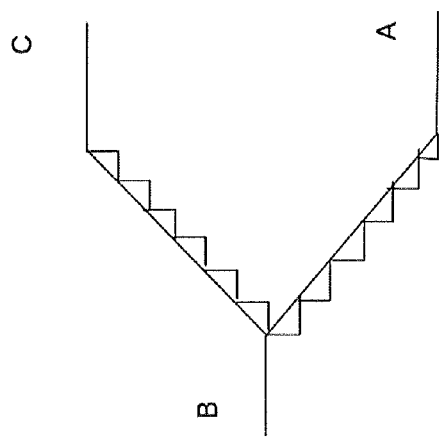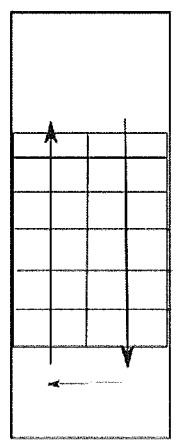

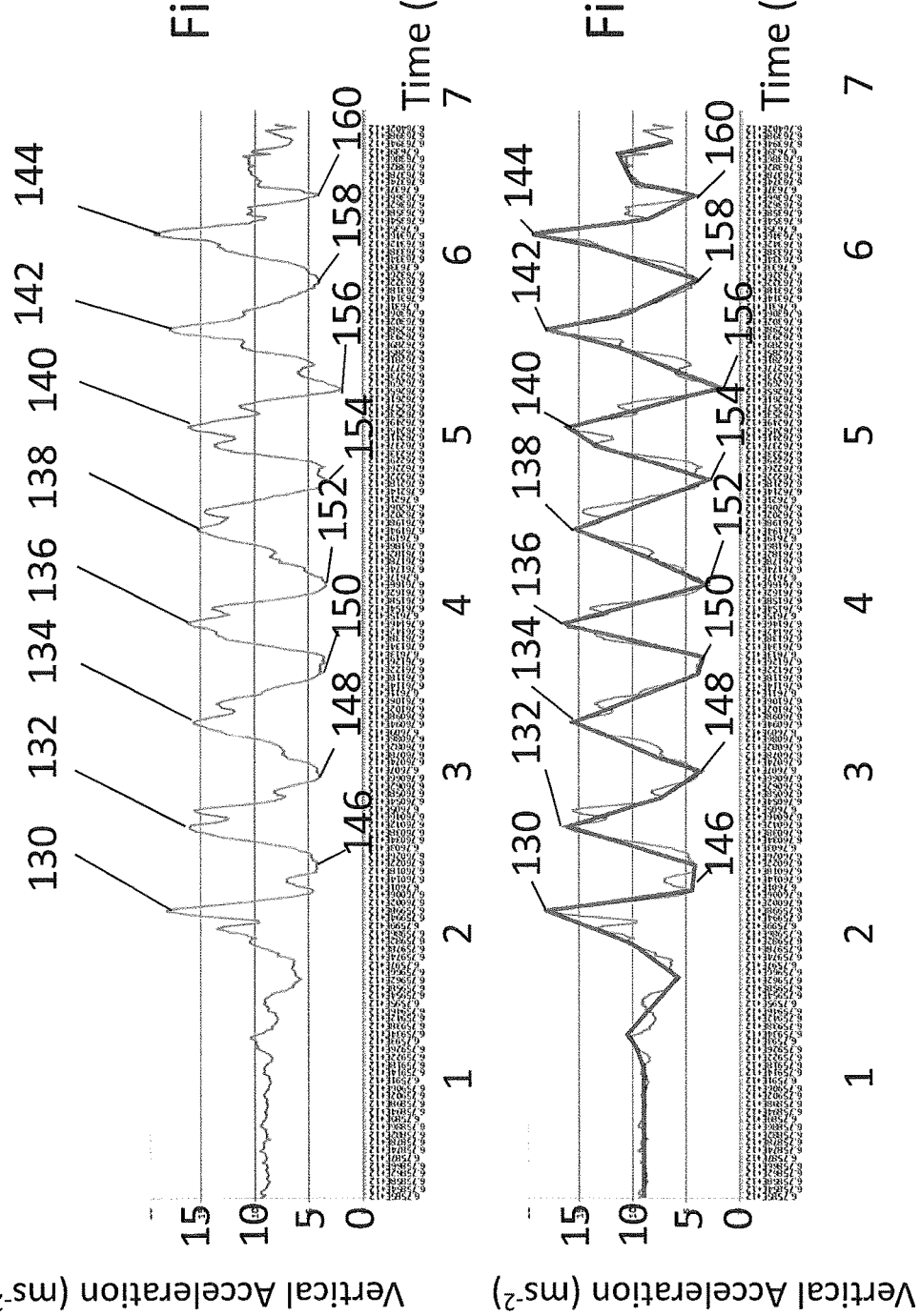

METHOD OF ESTIMATING POSITION OF A DEVICE USING GEOGRAPHICAL DESCRIPTIVE DATA

This application is the U.S. national phase of International Application No. PCT/GB2013/051985 filed 24 Jul. 2013 which designated the U.S. and claims priority to GB Application No. 1213172.8 filed 24 Jul. 2012 and claims the benefit of Provisional Application No. 61/676,029 filed 26 Jul. 2012, the entire contents of each of which are hereby incorporated by reference.

FIELD OF THE INVENTION

The invention relates to a method of estimating a position of a device, a computer readable medium storing computer executable code which when executed on a data processing apparatus causes the data processing apparatus to perform in accordance with such a method, a mobile device configured to perform such a method, a data processing apparatus, computer readable medium storing computer executable code which when executed on a data processing apparatus causes the data processing apparatus to perform in accordance with such a data processing apparatus and a mobile device comprising such a data processing apparatus.

BACKGROUND OF THE INVENTION

Estimating the position of a device, such as a mobile smartphone or an electromagnetic signal source, is becoming more important with the advent of location based services and electronic navigation tools. A number of different positioning technologies are available, but none of these positioning technologies are fully accurate or fully reliable under all circumstances.

Satellite position system (e.g. Global Positioning System (GPS)) modules which are capable of receiving data from a plurality of satellites to identify their position typically require a line of sight between a plurality of satellites and a satellite positioning system receiver to operate reliably. When such a line of sight is unavailable, such positioning modules may not be able to determine positions to a sufficient level of accuracy (if at all).

Alternative positioning system modules such as triangulation based positioning system modules capable of estimating the position of a device using signals received from base stations of a cellular telephone network (e.g. 2G, 3G, 3.5G or 4G mobile communications network) are not always usable/accurate where, for example, access to the cellular telephone network is poor, patchy or unavailable.

Furthermore, positioning system modules capable of estimating the position of a device using data measured from a number of electromagnetic signal sources of known location can be inaccurate because errors in the estimated locations of electromagnetic signal sources cause errors in the estimated positions of the device.

Thus none of the above positioning systems is completely accurate and reliable. Indeed the accuracy of these positioning systems varies typically depending on the environment in which the device whose position is being estimated is located. Inaccuracy and unreliability is typically amplified when the device whose position is being estimated is located in an indoor region.

Accordingly, improving the accuracy of existing positioning systems is therefore desirable, particularly for use in indoor regions.

SUMMARY OF THE INVENTION

A first aspect of the invention provides a method of estimating the position of a device, the method comprising: providing a database of location specific geographical descriptive data; obtaining location data relating to the position of the device; retrieving geographical descriptive data specific to an indoor region from the said database, the indoor region being selected dependent on the location data; and subsequently estimating the position of the device taking into account the retrieved data.

It will be understood that the term "geographical descriptive data" does not include characteristics (such as transmitted signal strengths) or (estimated or actual) positions of electromagnetic signal sources (such as wireless access points/bluetooth beacons or other electromagnetic signal sources which are useful for mobile positioning) located or detectable within the indoor region or fingerprint data relating to signal strengths of electromagnetic signal sources located or detectable within the indoor region. Rather, the term "geographical descriptive data" is used to refer to information describing (spatial) relationships between (e.g. relative or absolute) positions of features such as rooms, corridors and other physical (typically structural) features within one or more indoor regions. For example, the geographical descriptive data may comprise (e.g. digitised) floorplans of one or more indoor regions or data derived therefrom, and the retrieved data may comprise (at least part of) a (e.g. digitised) floorplan of the said indoor region or data derived therefrom. The retrieved geographical descriptive data may comprise the locations of one or more (typically two or more) of the following: a wall; a room; a portal such as a door; a corridor; a staircase/lift/escalator or other floor change feature. The retrieved geographical descriptive data may comprise information derived from positions of two or more physical features within the indoor region. The data derived from the said floorplan (where provided) may comprise one or more of: a path line representing a corridor of the indoor region; a node representing a junction between two or more corridors of the indoor region; a grid representing two or more rooms of the indoor region. Accordingly the retrieved geographical descriptive data may comprise one or more of: a path line representing a corridor of the indoor region; a node representing a junction between two or more corridors of the indoor region; a grid representing two or more rooms of the indoor region. Where the retrieved geographical descriptive data is derived from a floorplan, it may be that the floorplan from which the said data was derived is not included in the retrieved geographical descriptive data.

It may be that the step of subsequently estimating the position of the device comprises obtaining and using characteristics (such as transmitted signal strengths) or (estimated or actual) positions of electromagnetic signal sources located or detectable within the indoor region or fingerprint data relating to signal strengths of electromagnetic signal sources located or detectable within the indoor region. In this case, such data is typically obtained from signals transmitted by the electromagnetic signal sources or from a database of electromagnetic signal source data. However, in other embodiments, such data is not obtained or used. For example, the position of the device may be estimated using, for example, satellite positioning data taking into account the retrieved data.

By taking into account geographical descriptive data specific to the indoor region when estimating the position of the device, a more accurate estimate of the position of the device can be determined.

As part of taking into account the retrieved data, the method may comprise selecting data from the retrieved data and/or deriving data from the retrieved data and subsequently using the selected and/or derived data to estimate the position of the device.

It will be understood that "an indoor region" typically means within a building (which would typically comprise at least three walls connected to each other (or a cylindrical wall) and a roof extending between said walls (or between portions of the cylindrical wall). The geographical descriptive data specific to the indoor region may be specific to the indoor region as a whole or to individual subregions (e.g. a floor or a room) of the indoor region.

The device may be a (typically portable) personal electronic device, such as a mobile phone, smartphone, personal media player (e.g. mp3 player), tablet computer, laptop, netbook, personal data assistant (PDA), satellite positioning system (e.g. GPS) locator device and so on. Alternatively, the device may be a portable or stationary electromagnetic signal source such as a Bluetooth beacon, mobile telecommunications base station, Wireless Access Point (e.g. Wi-Fi hub), etc.

A (personal electronic) device may be used to determine its own position and/or a (personal electronic) device may be used to determine the position of another device such as an electromagnetic signal source. In another example, a server computer (typically in data communication with the device) may be used to determine the position of a (personal electronic) device and/or an electromagnetic signal source.

The database may be provided, for example, by one or more server computers (typically in data communication with the device or with another server computer configured to estimate the position of the device).

The step of subsequently estimating the position of the device taking into account the retrieved data is typically performed by the device or by a server computer (e.g. in data communication with the device).

The step of estimating the position of the device taking into account the retrieved data typically comprises calculating the position of the device taking into account the retrieved data.

Preferably the database stores a plurality of different types of geographical descriptive data. As explained below, the geographical descriptive data may comprise data which may be used (e.g. by a positioning system) to estimate a position of a device and/or the geographical descriptive data may comprise data which can be used to adjust an estimated position of a device.

In one embodiment, the location data may comprise positioning data relating to a previously estimated position of the device or positioning data entered manually by a user. The positioning data may be compared to the retrieved data to identify an indoor region conforming to the positioning data. The identified indoor region may be selected as the indoor region.

The location data may be provided by a positioning system (such as a satellite positioning system). Alternatively, the location data may be provided by (or derived from) electromagnetic signals transmitted from one or more electromagnetic signal sources (e.g. a Wi-Fi or Bluetooth beacon may transmit an estimate of its own position).

The location data may comprise a (current) provisional estimated position of the device. In this case, the provisional estimated position of the device may be provided by a positioning system such as a satellite positioning system or a positioning system based on processing electromagnetic signals received from electromagnetic signal sources of known position. The provisional estimated position may be compared to the retrieved data to determine an indoor region comprising (or being adjacent to) the provisional estimated position, the indoor region comprising (or being adjacent to) the provisional estimated position being the selected indoor region. In another alternative, the indoor region may be a region which the device is moving towards and/or which meets one or more proximity criteria with respect to the provisional estimated position.

The location data may be two-dimensional. For example, the location data may comprise x, y co-ordinates of the provisional estimated position. Alternatively, the location data may comprise a label, such as the name of a building (which with reference to the retrieved data implicitly defines a two-dimensional perimeter around the building).

More preferably, the location data may be three-dimensional. For example, the location data may comprise x, y, z co-ordinates of the provisional estimated position. Preferably, the z co-ordinate comprises a vertical position index such as a floor number within a building, or an estimate of the altitude of the device. Alternatively, the location data may comprise a label, such as the name of a building together with z co-ordinate data which may be an estimate of the altitude of the device or, more preferably a vertical position index such as a floor number within a building.

The step of subsequently estimating the position of the device taking into account the retrieved data may comprise adjusting the provisional estimated position of the device taking into account the retrieved data.

The retrieved data may comprise topological information relating to (e.g. one or more features of) the indoor region (e.g. and the relative or absolute positions of the said one or more features). The retrieved data may comprise topological information describing (at least part of) the indoor region.

The topological information may comprise layout information relating to or describing (at least part of, preferably all of) the indoor region. The topological information may comprise layout information describing the (spatial) relationship between two or more physical (typically structural) features of the indoor region. The layout information may comprise (at least part of) a floorplan of the indoor region or data derived therefrom. The layout information (or the floorplan) may describe the (spatial) relationship between topological features such as areas (or spaces) within the indoor region (such as rooms or corridors), linear features (e.g. walls), gaps in features (e.g. portals such as doors), floor-change features such as elevators, escalators or staircases, and so on (and typically the (estimated) relative or absolute positions thereof). The "layout information" does not include characteristics or (estimated) positions of electromagnetic signal sources located within the indoor region or fingerprint data relating to signal strengths of electromagnetic signal sources detectable within the indoor region.

It may be that the topological information identifies passable and/or impassable sections or features within the indoor region. Impassable sections or features may be linear one-dimensional sections or features (e.g. walls), two dimensional sections or features (e.g. closed rooms in a floor plan) and/or three dimensional sections or features (e.g. inaccessible volumes).

It may be that the topological information is (or has been) derived from one or more passable sections or features within the indoor region. It may be that the topological information is (or has been) derived from one or more impassable sections or features within the indoor region.

It may be that the topological information relates to one or more passable sections or features within the indoor region. It may be that the topological information relates to one or more impassable sections or features within the indoor region.

For example, the topological information may comprise the position and/or the extent of an impassable wall located within the indoor region, and the step of subsequently estimating the position of the device taking into account the retrieved data may comprise taking into account the fact that the device cannot pass through the said impassable wall when estimating the position of the device.

The provisional estimated position of the device may be adjusted taking into account (at least part of) the retrieved data (e.g. the topological information, where provided). For example, the method may comprise comparing the provisional estimated position of the device to a prior estimated position of the device taking into account the topological information to determine whether the device has followed a passable route between the prior estimated position and the provisional estimated position. If it has been determined that the device would need to have followed an impassable route, the provisional estimated position of the device may be adjusted to a position reachable from the prior position via a passable route within the indoor region.

The topological information may comprise one or more constraints defining possible and impossible positions of the device within the indoor region. In this case, the provisional estimated position of the device may be adjusted taking into account the constraints. For example, the step of estimating a position of the device may comprise adjusting the provisional estimated position of the device from an impossible position to a possible position of the device within the indoor region.

The topological information may comprise one or more paths, each path defining a range of possible positions of the device along a respective route within the indoor region. In this case, the provisional estimated position of the device may be "snapped" to a position lying on one of the one or more paths. For example, the method may comprise comparing the provisional estimated position of the device to the one or more paths thereby determining whether the provisional estimated position lies on one of said paths; and in response to a determination that the provisional estimated position of the device does not lie on one of said paths, adjusting the provisional estimated position to a position lying on one of the one or more paths (e.g. to the closest position lying on a path to the provisional estimated position). Alternatively, the method may further comprise: identifying one of said paths on which the device was previously located; determining a closest position on said path to the provisional estimated position; and estimating that the device is located at said closest position on said path.

Preferably, one or more of the said paths extend in three dimensions. Typically, the said paths comprise horizontal and vertical components. For example, the paths may extend from a first floor in a building to a second floor of the building, typically via one or more topological features (such as elevators, staircases, escalators, ramps or the like).

One or more of the said paths may extend between floors of different heights.

One or more of the said paths may extend between vertically stacked floors.

One or more of the said paths may comprise a first section extending horizontally on a first floor, a second section extending horizontally on a second floor and a third section (at least part of which third section typically comprises a vertical component) extending between the first and second sections.

The topological information may comprise positions of one or more topological features (e.g. doorways, staircases, elevators, the ends of corridors, turning points in corridors) and one or more predefined zones, each zone being associated with (and typically being provided around) a respective one of the said topological features.

The method according to the first aspect of the invention may further comprise: determining whether an estimated position of the device is within one of the said predefined zones; and, in response to a determination that the estimated position of the device is within one of the said predefined zones, activating the execution of a pattern recognition algorithm associated with the topological feature associated with the said predefined zone.

For example, a zone may be defined around a doorway. In this case, when the estimated position of the device is within the zone, a pattern recognition algorithm associated with the doorway may be activated.

By "predefined", we mean that the zone around the said topological feature is defined before activating execution of the said pattern recognition algorithm in response to entering the said zone.

The estimated position may be the provisional estimated position. Alternatively, the estimated position may be a position which has been adjusted taking into account the retrieved data.

Preferably, the method further comprises: in response to a determination that the estimated position of the device is within said one of the predefined zones providing one or more reference patterns associated with the topological feature associated with said one of the predefined zones to a positioning system module.

Typically, the pattern recognition algorithm comprises: comparing movement of the device to one or more reference movement patterns to determine whether the device has passed through or interacted with the topological feature associated with the said predefined zone; and adjusting the estimated position of the device in response to a determination that the device has passed through or interacted with the said topological feature.

Typically the method comprises retrieving the one or more reference movement patterns from the database before comparing movement of the device to the said reference movement pattern(s).

The reference movement patterns are typically representative of successive movements expected by the device when it passes through or interacts with the topological feature (e.g. when the device passes through the doorway).

When the movement of the device matches the reference movement pattern, the estimated position of the device may be adjusted to a position at or adjacent to the topological feature. Typically, the estimated position of the device is adjusted to a position on a path passing through or adjacent to the topological feature associated with the zone.

There may be a delay between the device actually passing through or interacting with a particular topological feature and a determination that the device has passed through or interacted with that topological feature. Accordingly, the method may further comprise retrospectively determining that the device has passed through or interacted with a particular topological feature, and adjusting one or more previously estimated positions of the device to a position at or adjacent to the topological feature.

The method may further comprise estimating a current position of the device by estimating a movement of the device during the said delay and combining said estimated movement with the adjusted previously estimated position(s). The said delay may be estimated by comparing chronological indices (e.g. time stamps) associated with the (e.g. satellite positioning or Wi-Fi) signals from which positions of the device are determined. Estimating movement of the device during the delay may comprise translating subsequently estimated positions of the device (i.e. positions of the device estimated after the device had passed through or interacted with the topological feature) in accordance with the adjustments applied to the said previously estimated position(s). Alternatively, estimating movement of the device during the delay may comprise determining or obtaining a (e.g. average) speed and/or direction of movement of the device during said delay and generating a motion vector from the estimated speed and direction of movement of the device during, and the duration of, the delay. Additionally or alternatively, estimating movement of the device during the delay may comprise processing data generated by one or more sensors (e.g. accelerometer, compass) internal to the device during the delay to generate one or more motion vectors.

The size and shape of each predefined zone may be dependent on the topological feature with which it is associated. Where first and second different topological features are provided (e.g. a doorway and a staircase), a predefined zone provided around the first topological feature may be either or both a different size and shape from a predefined zone provided around the second topological feature.

When a user carries a device through a feature such as a doorway, elevator or staircase from a corridor, the user may turn through approximately 90°. Accordingly, in one embodiment, the said pattern recognition algorithm may be a turning point detection algorithm which may be used to determine whether the device has turned through a turning point. It will be understood that, although 90° turning points may be easier to detect, a turning point does not necessarily require a turn through 90°. In an alternative embodiment, a turning point comprises a turn through less than or greater than 90°.

When a turning point (e.g. through approximately 90°) is detected within the predefined zone of such a feature, the position of the device may be adjusted to be at or adjacent to the said feature at the time at which the turning point was detected. Additionally or alternatively, a delay between the device actually passing through the turning point and detection of the turning point may be taken into account when adjusting the estimated position, as above.

In one embodiment, the said pattern recognition algorithm is a floor-change detection algorithm. The floor-change algorithm may be used to determine whether the device has changed floors within a building.

The floor change detection algorithm may further comprise: generating one or more vertical movement indicators of the device.

The vertical movement indicators may be used to validate or invalidate a determination that the device has moved vertically upwards or vertically downwards (e.g. by ascending or descending a staircase) in the floor-change detection algorithm.

The method may further comprise updating a vertical position of the device in response to a determination that the device has changed floors (e.g. in response to a determination that movement of the device matches one or more relevant reference patterns).

Preferably, the method further comprises deactivating an execution of the said pattern recognition algorithm in response to a determination that the estimated position of the device is outside of the said predefined zone.

By activating the execution of the pattern recognition algorithm in response to a determination that the estimated position of the device is within the predefined zone and deactivating execution of the pattern recognition algorithm in response to a determination that the estimated position of the device is outside the predefined zone, electrical power can be saved and false detections are minimised.

The retrieved data (or data derived therefrom) may indicate that one or more positioning systems from a group of positioning systems is (are) available (or meet one or more accuracy criteria) or unavailable (or meet one or more inaccuracy criteria) in each of one or more of the predetermined zones.

Accordingly, the method according to the first aspect of the invention may comprise activating and/or deactivating one or more positioning algorithms and/or one or more positioning systems (or part thereof, such as one or more sensors) in response to a determination that the device has entered and/or left one of the said predefined zones.

In one embodiment, activating and/or deactivating one or more positioning algorithms and/or one or more positioning systems (or part thereof, such as one or more sensors) comprises transmitting an activation and/or deactivation signal. The activation and/or deactivation signals may be transmitted internally within a device, or from one device to another.

The part of the positioning systems which may be activated and/or deactivated may include: a satellite positioning receiver, an electromagnetic signal receiver (such as Wi-Fi or Bluetooth receivers), an accelerometer, a compass, a gyroscope and/or a barometer.

Typically, the method involves activating one or more positioning algorithms and/or one or more positioning systems (or part thereof) which are available (and/or which meet one or more accuracy criteria) in a predefined zone in which the device is located and/or deactivating one or more positioning algorithms and/or one or more positioning systems (or part thereof) which are unavailable (and/or which meet one or more inaccuracy criteria and/or are unnecessary) in a predefined zone in which the device is located.

For example, in an indoor region where it is known (e.g. from data comprised in the retrieved data) that satellite positioning is unavailable, the method may comprise deactivating a satellite positioning algorithm and/or a satellite positioning module (or part thereof). In the said indoor region, it may also be known (e.g. from data comprised in the retrieved data) that a positioning system based on processing signals received from one or more electromagnetic signal sources of known location is particularly accurate. Accordingly, the method may additionally or alternatively comprise activating a positioning algorithm and/or positioning system module (or part thereof) operable to estimate the position of the device by processing signals received from one or more electromagnetic signal sources of known location.

By activating one or more positioning algorithms and/or one or more positioning systems (or part thereof) only when they are available (and/or when they meet one or more accuracy criteria) and deactivating one or more positioning algorithms and/or one or more positioning systems (or part thereof) when they are unavailable (and/or when they meet one or more inaccuracy criteria), electrical power can be saved.

The method may further comprise obtaining electromagnetic signal source data relating to one or more electromagnetic signal sources located within the indoor region (and/or relating to one or more electromagnetic signal sources located outside of the indoor region but within detectable range of the indoor region). The electromagnetic signal source data relating to one or more electromagnetic signal sources located within the indoor region (and/or one or more electromagnetic signal sources located outside of the indoor region but within detectable range of the indoor region) may be obtained (partly or fully) by receiving and processing electromagnetic signals transmitted by the said electromagnetic signal sources. Additionally or alternatively the electromagnetic signal source data relating to one or more electromagnetic signal sources located within the indoor region (and/or one or more electromagnetic signal sources located outside of the indoor region but within detectable range of the indoor region) may be (partly or fully) retrieved from a database of electromagnetic signal data.

The electromagnetic signal source data may comprise one or more characteristics of one or more electromagnetic signal sources located within the indoor region. Said characteristics typically include the locations of the electromagnetic signal sources, identifiers of the electromagnetic signal sources (such as MAC addresses), and/or transmitted signal strengths from the signal sources.

The electromagnetic signal source data may comprise the (e.g. estimated) relative or absolute) positions of one or more electromagnetic signal sources located within the indoor region (and/or of one or more electromagnetic signal sources located outside of the indoor region but within detectable range of the indoor region).

The retrieved data from the database of location specific geographical descriptive data may comprise one or more electromagnetic signal propagation characteristics relating to the propagation of electromagnetic signals within the indoor region, or data from which one or more electromagnetic signal propagation characteristics can be derived.

The electromagnetic signal propagation characteristics may comprise electromagnetic signal propagation models (e.g. path loss equations) appropriate for use in the indoor region. Appropriate path loss coefficients may also be provided for use in the electromagnetic signal propagation models in respect of the indoor regions.

The electromagnetic signal propagation characteristics, or data from which they may be derived, may additionally or alternatively comprise environmental parameters which affect the propagation characteristics of electromagnetic signals within the indoor region. For example, the environmental parameters may comprise refractive indices of materials used in the indoor region (e.g. for the outer walls, segmentation walls, ceiling(s) and floor(s)), the number of walls/ceilings within the indoor region, or path loss coefficients quantifying the expected electromagnetic signal attenuation within the indoor regions. The environmental parameters may indicate that the indoor region comprises open space, largely absent of ceilings and/or segmentation walls.

Data from which one or more characteristics are derivable may comprises one or more reference indicators which can be used to select one or more appropriate electromagnetic propagation characteristics (e.g. path loss coefficient and/or path loss model) from a group of candidate characteristics.

In one embodiment, electromagnetic signal propagation characteristics vary across the indoor region. Accordingly, the electromagnetic signal propagation characteristics comprised in the retrieved data may be specific to particular subregions of the indoor region.

The step of subsequently estimating the position of the device taking into account the retrieved data may comprise estimating the position of the device by processing signals received from electromagnetic signal sources of known position (such as by triangulation). For example, the step of subsequently estimating the position of the device taking into account the retrieved data may comprise: receiving electromagnetic signals transmitted from one or more electromagnetic signal sources (typically, but not necessarily, by the device whose position is being estimated); and processing (e.g. triangulating) the electromagnetic signals or data derived therefrom together with one or more of the one or more characteristics of the one or more electromagnetic signal sources and/or one or more of the one or more electromagnetic signal propagation characteristics.

The method may further comprise: receiving electromagnetic signals transmitted by one or more electromagnetic signal sources (typically, but not necessarily, by the device whose position is being estimated); obtaining electromagnetic signal source data relating to the one or more electromagnetic signal sources; and processing (e.g. triangulating) the received electromagnetic signals or data derived therefrom, the obtained electromagnetic signal source data and the retrieved data from the database of location specific geographical descriptive data to estimate (typically by calculating an estimation of) the position of the device. Typically the electromagnetic signal source data comprises the (e.g. (estimated) relative or absolute) positions of the said electromagnetic signal sources. The electromagnetic signal source data may further comprise one or more characteristics of the said electromagnetic signal sources.

The method may further comprise retrieving one or more electromagnetic signal propagation characteristics from the database of location specific geographical descriptive data relating to (or describing the nature of electromagnetic signal propagation within) the indoor region and using the said one or more electromagnetic signal propagation characteristics when processing the received electromagnetic signals or data derived therefrom together with the obtained electromagnetic signal source data to estimate (or calculate and estimation of) the position of the device.

The method may further comprise: receiving electromagnetic signals transmitted from one or more electromagnetic signal sources at a plurality of receiving devices; and processing (e.g. triangulating) the electromagnetic signals or data derived therefrom together with obtained electromagnetic signal source data relating to the said electromagnetic signal sources and/or one or more of the one or more electromagnetic signal propagation characteristics (typically relating to the indoor region) from the retrieved data from the database of location specific geographical descriptive data to estimate a position of the device, the device comprising one of the said one or more electromagnetic signal sources.

By estimating the position of the device based on signals received by a plurality of receiving devices, the position of the device may be more accurately estimated. This is particularly useful for mapping stationary electromagnetic signal sources.

The position of the device may be estimated by, for example, a server computer which receives the electromagnetic signals or data derived therefrom from the plurality of receiving devices.

It will be understood that the step of estimating a position of the device may comprise updating a previously estimated position of the device.

The device whose position is being estimated may be the device receiving the electromagnetic signals; alternatively, the device whose position is being estimated may be an electromagnetic signal source transmitting the said electromagnetic signals.

In some embodiments, the retrieved data defines a plurality of subregions within the indoor region.

By dividing the indoor region into a plurality of subregions, the location specificity of the retrieved data may be improved, thus improving the accuracy of position estimates performed taking into account the retrieved data.

For example, the retrieved data may provide one or more electromagnetic propagation characteristics specific to each subregion.

The retrieved data may also include one or more relationship rules which specify whether the device can move between particular subregions (or between adjacent indoor regions). In this case, the step of estimating the position of the device may comprise comparing a provisional estimated position of the device with a prior estimated position of the device to determine whether one or more relationship rules have been broken and adjusting the provisional estimated position to a position complying with the said relationship rule(s) in response to a determination that said one or more relationship rules have been broken.

Optionally, said one or more relationship rules may be direction specific—i.e. the one or more of the relationship rules may specify whether the device can move between particular subregions (or between indoor regions) in a particular direction and/or along a particular path. For example, a rule may specify that the device cannot travel from a first subregion of the indoor region to a second subregion of the indoor region on a moving walkway (travelator) providing a unidirectional path from the second subregion to the first subregion. In another example, a relationship rule may be provided which specifies that the device cannot enter the indoor region through a dedicated exit.

In some embodiments, the method may further comprise: receiving one or more electromagnetic signals in a first subregion from one or more electromagnetic signal sources comprising at least one electromagnetic signal source located in a second subregion of the indoor region; and estimating the position of the device by processing the electromagnetic signals or data derived therefrom together with retrieved data (e.g. electromagnetic signal propagation characteristics) relating to the first and/or second subregions and/or any subregions between the device and the said at least one electromagnetic signal source in the second subregion. It will be understood that it may be necessary to obtain electromagnetic signal source location data relating to the positions of the said electromagnetic signal sources, e.g. by deriving the said positions from signals transmitted by the electromagnetic signal sources and/or obtaining said data from a database of electromagnetic signal sources. It may be that the relevant subregions are identified by comparing the said electromagnetic signal source location data to the retrieved data.

In this way, the position of the device can be estimated taking into account detailed location specific data relating to the propagation path travelled by the electromagnetic signals. This helps to improve the accuracy of the position estimate.

It will be understood that the first and second subregions are typically different subregions from each other, but in some cases they may be the same subregion.

Preferably, the step of subsequently estimating the position of the device taking into account the retrieved data comprises: determining a relationship between the first subregion and the second subregion from the retrieved data; associating a weighting with the signal(s) received from the electromagnetic signal source or data derived therefrom, the weighting being dependent on said relationship; and processing said electromagnetic signals or data derived therefrom taking into account said weighting.

The relationship between the first subregion and the second subregion may comprise a quantity of subregions between the first subregion and the second subregion. By taking into account the quantity of subregions between the first and second subregion, an estimation can be made of the reliability of a position estimate based on said electromagnetic signals. For example, if there are a high number of (e.g. five or more) subregions between the first and second subregions, a low weighting (e.g. one) may be associated with the signals received from the electromagnetic signal source, thereby applying a low significance to those signals. Alternatively, if the first subregion is adjacent to (or the same as) the second subregion, a high weighting may be associated with the signals received from the electromagnetic signal source, thereby applying a high significance to those signals. This helps to improve the accuracy of the updated position estimate.

Additionally or alternatively, the relationship between the first subregion and the second subregion may comprise a quantity and/or type/material of walls between the first subregion and the second subregion. The type/material of walls (e.g. structural/partitioning/brick/glass) may be taken into account by associating a weighting with each wall depending on its type. Taking into account the number and/or type/material of the walls may be more accurate than simply counting the number of subregions between the first and second subregions because some subregions may have a number of structural walls which may cause significant signal attenuation compared to other subregions which may have no structural or partitioning walls (for example).

Additionally or alternatively the relationship between the first subregion and the second subregion may comprise a signal propagation characteristic (e.g. path loss coefficient) relating to the propagation of electromagnetic signals between the first and second subregions. By taking into account a signal propagation characteristic between the first and second subregions, a more accurate estimation can be made of the reliability of a position estimate based on said electromagnetic signals. For example, even if there are five subregions between the first and second subregions, the signal propagation characteristic may indicate that none of the five subregions comprise any partitioning or structural walls, in which case a position estimate performed using signals from the electromagnetic signal source may be relatively accurate, despite the relatively large number of subregions between the first and second subregions. As such, a relatively high weighting may be associated with those signals.

The relationship may additionally or alternatively comprise a path loss model describing how signals attenuate between the second and first subregions.

It will be understood that, preferably, the relationships comprise both the number of subregions between the first and second subregions and one or more signal propagation characteristics relating to the propagation of electromagnetic signals between the first and second subregions (and preferably the number and/or type and/or material of walls between the first and second subregions) to optimise the position estimates based on said signals.

It will also be understood that the weighting associated with some signals may be zero, thereby filtering out those signals altogether for position estimation. This is particularly useful if signals from a particular electromagnetic signal source are considered to be unreliable for use in position estimation.

Preferably, the step of subsequently estimating the position of the device comprises: predicting one or more possible future positions of the device (typically, but not necessarily using the retrieved data); and comparing the one or more predicted future positions of the device with a or the provisional estimated position of the device to determine whether the provisional estimated position of the device matches one of the predicted possible future positions. The predicted possible future positions may be expressed as one or more loci.

Typically, the method further comprises measuring a (typically average, e.g. mean) speed of the device; and predicting said one or more possible future positions of the device using both the speed of the device and the retrieved data.

The method may further comprise measuring a direction of movement of the device and predicting said one or more possible future positions of the device using both the direction of movement of the device and the retrieved data (and preferably also the speed of the device).

Preferably, the method further comprises adjusting the provisional estimated position of the device to match (or at least such that the provisional estimated position of the device is adjusted to become closer to) one of the predicted possible future positions (typically in response to a determination that the provisional estimated position does not match one of the predicted possible future positions).

In some cases, the method may comprise adjusting the provisional estimated position of the device to match (or at least such that the provisional estimated position of the device is adjusted to become closer to) one of the predicted possible future positions in response to a determination that the provisional estimated position does not match one of the predicted possible future positions in combination with a determination that the provisional estimated position meets one or more adjustment criteria. For example, the method may comprise adjusting the provisional position of the device to match (or at least such that the provisional estimated position of the device is adjusted to become closer to) one of the predicted possible future positions in response to a determination that the positional difference between the provisional estimated position and the closest predicted possible future position is greater than a threshold distance (that the positional difference is greater than the threshold distance may thus be one of the adjustment criteria). In another example, the adjustment criteria may comprise that a speed of movement of the device is below a threshold speed. In this case, the method may comprise determining a speed of the device, comparing the determined speed of the device to a threshold speed and adjusting the provisional estimated position to match a predicted possible future position of the device in response to a determination that the determined speed is less than the threshold speed. In yet another example, the adjustment criteria may include that the device moves from a first position to a second position within a threshold time period. Accordingly, the method may comprise determining a time period for which the device is estimated to have remained in substantially the same position; comparing the determined time period to a threshold time period; and adjusting the provisional estimated position to match a predicted possible future position of the device in response to a determination that the determined time period is less than the threshold time period.

It will be understood that, if the one or more adjustment criteria are not met, it may be that the provisional estimated position is not updated to match (or at least such that the provisional estimated position of the device is adjusted to become closer to) a predicted possible future possible future position of the device. Thus, in the above examples, if the distance is less than the threshold distance, the determined speed is greater than the threshold speed and/or the determined time period is greater than the threshold time period, then the provisional estimated position is not updated to match a predicted possible future position of the device.

Typically, the method further comprises: obtaining second location data relating to an updated position of the device; retrieving geographical descriptive data specific to a second indoor region from the said database, the second indoor region being selected dependent on the second location data; and subsequently estimating the position of the device taking into account the retrieved data concerning the second indoor region.

That is, the method allows for switching between subregions of an indoor region and/or between indoor regions and updating the retrieved data in accordance with a subregion/indoor region selected dependent on the second location data. As above, the second location data may comprise a position of the device or it may simply identify the second indoor region.

The method may comprise validating or invalidating a determination that the device has moved from the first indoor region to the second indoor region (i.e. determining whether a movement from the first indoor region to the second indoor region is valid). In this case, the step of subsequently estimating the position of the device taking into account the retrieved data concerning the second indoor region may be performed in response to a validation of the determination that the device has moved from the first indoor region to the second indoor region.

Validating or invalidating the determination that the device has moved from the first indoor region to the second indoor region may comprise, for example, determining whether the device has passed through or interacted with a topological feature (e.g. an elevator, escalator, staircase, passageway, doorway or the like) linking the indoor region and the second indoor region. This may be done, for example, by comparing movements of the device with one or more reference movement patterns as described above. In another example, validating or invalidating the determination that the device has moved from the first indoor region to the second indoor region may comprise checking one or more constraints provided by the retrieved data (or data derived therefrom) to determine whether there is a passable route from the indoor region to the second indoor region.

If the determination that the device has moved from the first indoor region to the second indoor region is invalidated, the method may comprise rejecting the second location data. In this case, the method may further comprise using the (originally) retrieved data to estimate an updated position of the device.

A second aspect of the invention provides data processing apparatus comprising a geographical descriptive data processing module in communication with a database of location specific geographical descriptive data, the geographical descriptive data processing module being configured to: select an indoor region dependent on location data relating to the position of a device; retrieve geographical descriptive data specific to the indoor region from the database; and to subsequently estimate a position of the device taking into account the retrieved data and/or to output data from the retrieved data or data derived therefrom which is usable for estimating the position of the device.

Typically, the geographical descriptive data processing module is further configured to receive the location data relating to the position of a device.

Typically, the geographical descriptive data processing module is further configured to retrieve geographical descriptive data specific to the indoor region from the database in response to receipt of said location data and/or selection of the indoor region.

By estimating the position of the device taking into account the retrieved data, or by outputting location specific data which is usable for estimating a position of the device, a more accurate estimate of the position of the device can be determined. This is because features of the particular local environment in which the device is located may be taken into account in the estimation of a position of the device.

The location data may comprise a provisional estimated position of the device. In this case, subsequently estimating a position of the device taking into account the retrieved data may comprise adjusting the provisional estimated position of the device taking into account the retrieved data. By adjusting the provisional estimated position taking into account the retrieved data, the accuracy of the estimated position can again be improved.

The location data is typically provided by a positioning system, such as satellite positioning system or a positioning system based on processing electromagnetic signals received from one or more electromagnetic signal sources of known position, or the location data may be entered manually.

The location data may be provided by a positioning system (such as a satellite positioning system). Alternatively, the location data may be provided by (or derived from) electromagnetic signals transmitted from one or more electromagnetic signal sources (e.g. a Wi-Fi or Bluetooth beacon may transmit an estimate of its own position).

Preferably, the data processing apparatus further comprises a computer readable storage medium storing the database. The computer readable storage medium may be provided in a one or more server computers accessible (directly or indirectly) by a Geographical Descriptive Data Processing Module (GDDPM). In this case, the GDDPM may be configured to access the database on the server computer(s) via a data communications network such as a (e.g. 2G, 2.5G, 3G, 4G) mobile telecommunications network or the internet (e.g. via Wi-Fi or Wi-MAX access points). Alternatively, the computer readable storage medium may be provided on a personal electronic device together with the GDDPM. In this case, the GDDPM may be configured to access the database via one or more signal busses internal to the personal electronic device.

In one embodiment, a primary server computer is provided in (wireless and/or wired) data communication with a plurality of database servers, each of the database servers (and optionally the primary server) comprising elements of the database. In this case, the GDDPM may be in data communication with the primary server, but not in direct communication with the database servers. Optionally, the GDDPM may also be in data communication with the database servers. Providing the data on a plurality of servers improves the robustness of the data processing apparatus.

Preferably the database of location specific geographical descriptive data stores a plurality of different types of geographical descriptive data. As explained below, the geographical descriptive data may comprise data which may be used (e.g. by a positioning system) to estimate a position of a device and/or the geographical descriptive data may comprise data which can be used to adjust an estimated position of a device by the GDDPM. Preferably, the geographical descriptive data stored in the database (and/or typically the retrieved data from the location specific geographical descriptive database) comprises at least one, at least two or at least three of the following (and/or the retrieved data comprises one or more, two or more or three or more of the following): (at least part of) a floorplan of the indoor region or data derived therefrom; one or more electromagnetic signal propagation characteristics relating to the propagation of electromagnetic signals within the indoor region, or data from which the said characteristics may be derived; topological information relating to (e.g. one or more physical features of) the indoor region (e.g. and the relative or absolute positions of the said one or more features); layout information describing the (spatial) relationship between two or more physical features (e.g. topological features such as rooms, corridors, walls, portals (e.g. doors) or floor-change features) of the indoor region; topological information identifying passable and/or impassable sections or features within the indoor region; topological information derived from one or more passable sections or features within the indoor region and/or from one or more impassable sections or features within the indoor region; topological information relating to one or more passable sections or features within the indoor region and/or one or more impassable sections or features within the indoor region; one or more constraints defining possible and impossible positions of the device within the indoor region; one or more relationship rules specifying whether the device can move between particular subregions of an indoor region or between adjacent indoor regions; one or more paths, each path defining a range of possible positions of the device along a respective route within the indoor region; and one or more reference movement patterns representative of successive movements expected by the device when it passes through or interacts with the topological feature.

The data processing apparatus may further comprise a positioning system module (typically provided in data communication with the GDDPM) configured to obtain electromagnetic signal source data relating to one or more electromagnetic signal sources located or detectable within the indoor region. The electromagnetic signal source data may comprise one or more characteristics of one or more electromagnetic signal sources located or detectable within the indoor region (such as transmitted signal power) and/or the positions of one or more electromagnetic signal sources detectable or located within the indoor region. The positioning system module may be configured to (partly or fully) obtain the electromagnetic signal source data by receiving and processing electromagnetic signals comprising the said data transmitted by the said electromagnetic signal sources. Additionally or alternatively, the positioning system module may be configured to (partly or fully) obtain the electromagnetic signal source data by retrieving the said data from a database of electromagnetic signal source data.

The said electromagnetic signal source characteristics are described above with respect to the first aspect of the invention.

The retrieved data may comprise one or more electromagnetic signal propagation characteristics relating to the propagation of electromagnetic signals within the indoor region, or data from which one or more electromagnetic signal propagation characteristics can be derived.

These propagation characteristics are described above with respect to the first aspect of the invention.

Typically, the GDDPM is configured to output propagation characteristics relevant to the indoor region (or one or more subregions of the indoor region) on request for use by, for example, a positioning system to estimate the position of the device.

Preferably the retrieved data comprises topological information identifying passable and impassable sections or features within the indoor region. Impassable sections or features may be linear one-dimensional sections or features (e.g. walls), two dimensional sections or features (e.g. closed rooms in a floor plan) and/or three dimensional sections or features (e.g. inaccessible volumes).

It may be that the topological information is (or has been) derived from one or more passable sections or features within the indoor region. It may be that the topological information is (or has been) derived from one or more impassable sections or features within the indoor region.

It may be that the topological information relates to one or more passable sections or features within the indoor region. It may be that the topological information relates to one or more impassable sections or features within the indoor region.

For example, the topological information in the retrieved data from the database of location specific geographical descriptive data may comprise the position and/or the extent of an impassable wall located within the indoor region, and the GDDPM or a or the positioning system module in data communication with the GDDPM may be configured to estimate the position of the device taking into account the retrieved data taking into account the fact that the device cannot pass through the said impassable wall when estimating the position of the device.

When the location data comprises a provisional estimated position of the device, the GDDPM may be configured to adjust the provisional estimated position of the device taking into account the retrieved data (e.g. the topological information, where provided). An example of this is described above with respect to the first aspect of the invention.

The topological information may comprise one or more constraints defining possible and impossible positions of the device within the indoor region. When the location data comprises a provisional estimated position of the device, the GDDPM may be configured to adjust the provisional estimated position of the device to comply with the constraints.

The topological information may comprise one or more paths, each path defining a range of passable positions along a respective route within the indoor region. When the location data comprises a provisional estimated position of the device, the GDDPM may be configured to adjust (or "snap") the provisional estimated position of the device to a position on one of the paths.

Preferably, each of the one or more paths comprises a continuous range of possible positions of the device along said respective route within the indoor region.

Preferably the topological information comprises positions of one or more topological features. The one or more topological features may comprise, for example but not exclusively, portals (such as doorways, entrances/exits, elevators), escalators, travelators (moving walkways), the ends of corridors, turning points in corridors, staircases and so on.

Preferably, the topological information further comprises one or more predefined zones, each zone being associated with one of the said topological features.

Preferably, the geographical descriptive data processing module is further configured to determine whether an estimated position of the device is within one of the said predefined zones and, in response to a determination that the estimated position of the device is within one of the said predefined zones, to activate the execution of a pattern recognition algorithm associated with the topological feature associated with the said predefined zone.

The estimated position of the device may be a provisional estimated position of the device which may be provided by, for example, a positioning system such as a satellite positioning system. Alternatively, the estimated position may be a position which has been adjusted by the GDDPM taking into account the retrieved data.

Each reference movement pattern typically comprises a pattern of movement which is consistent with movement of the device passing through or interacting with the topological feature.

Typically, the geographical descriptive data processing module is further configured to, in response to a determination that the estimated position of the device is within said one of the predefined zones, retrieve one or more reference patterns associated with the topological feature associated with said one of the predefined zones from the database.

Typically the geographical descriptive data processing module is further configured to provide said one or more reference patterns to a positioning system module.

Adjusting a provisional estimated position of the device may comprise adjusting the position of the device to substantially match a position of (or a position adjacent to) the topological feature with which the pattern recognition algorithm is associated.

By determining when a device has passed through or interacted with a topological feature, the position of the device can be estimated to a greater degree of accuracy, given that the position of the topological feature is accurately known from the geographical descriptive data.

There may be a delay between the device actually passing through or interacting with a particular topological feature and a determination that the device has passed through or interacted with that topological feature. Accordingly, the GDDPM may be configured to retrospectively determine that the device has passed through or interacted with a particular topological feature, and to adjust one or more previously estimated positions of the device to a position at or adjacent to the topological feature.

The GDDPM may also be configured to estimate a current position of the device by estimating a movement of the device during the said delay and combining said estimated movement with the adjusted previously estimated position(s). The GDDPM may be configured to estimate said delay by comparing chronological indices (e.g. time stamps) associated with the (e.g. satellite positioning or Wi-Fi) signals from which positions of the device are determined. The GDDPM may be configured to estimate movement of the device during the delay by translating subsequently estimated positions (i.e. positions estimated after the device had passed through or interacted with the topological feature) of the device in accordance with the adjustments applied to the said previously estimated position(s). Alternatively, the GDDPM may be configured to estimate the movement of the device during the delay by determining or obtaining a (e.g. average) speed and/or direction of movement of the device during said delay and generating a motion vector from the estimated speed and direction of movement of the device during, and the duration of, the delay. Additionally or alternatively, the GDDPM may be configured to estimate movement of the device during the delay by processing data generated by one or more sensors (e.g. accelerometer, compass) internal to the device during the delay, to generate one or more motion vectors, or obtaining the said motion vectors from a sensors module comprising the said sensors. The GDDPM may be configured to combine the estimated movement of the device (e.g. motion vectors) during the delay with the adjusted previously estimated position(s) to estimate the current position of the device.

As described above with respect to the first aspect of the invention, the size and shape of each predefined zone may be dependent on the topological feature with which it is associated. Where first and second different topological features are provided (e.g. a doorway and a staircase), a predefined zone provided around the first topological feature may be either or both a different size and shape from a predefined zone provided around the second topological feature.

Preferably, the GDDPM is further configured to deactivate the said pattern recognition algorithm(s) in response to a determination that the estimated position of the device is outside of the said predefined zone.

By activating the execution of the pattern recognition algorithm in response to a determination that the estimated position of the device is within the predefined zone and deactivating execution of the pattern recognition algorithm in response to a determination that the estimated position of the device is outside the predefined zone, electrical power can be saved and false detections are minimised.

The topological information may define a plurality of zones, each zone of the said plurality of predefined zones being associated with (and typically provided around) a respective topological feature, and each predefined zone of the said plurality of zones having a different size and/or shape.

The retrieved data (or data derived therefrom) may indicate that one or more positioning algorithms from a group of positioning algorithms is (are) available (or meet one or more accuracy criteria) or unavailable (or meet one or more inaccuracy criteria) in each of one or more of the predetermined zones.

Accordingly, the GDDPM may be further configured to activate and/or deactivate execution of one or more positioning algorithms and/or positioning systems (or part thereof) in response to a determination that the device has entered and/or left one of the said predefined zones.

In one embodiment, the GDDPM is configured to activate and/or deactivate one or more positioning algorithms and/or one or more positioning systems (or part thereof, such as one or more sensors) by transmitting an activation and/or deactivation signal. The activation and/or deactivation signals may be transmitted internally within a device comprising the GDDPM. Alternatively, the activation and/or deactivation signals may be transmitted from a first device (e.g. a server computer) comprising the GDDPM to a second device (e.g. a mobile personal electronic device).

The GDDPM may be configured to activate and/or deactivate execution of one or more positioning algorithms and/or positioning systems (or part thereof) either directly or indirectly. For example, the GDDPM may be configured to send data to a positioning system module instructing the positioning system module to execute, or deactivate execution of, a positioning algorithm and/or positioning system (or part thereof).

By activating one or more positioning algorithms and/or one or more positioning systems (or part thereof) only when they are available (and/or when they meet one or more accuracy criteria) and deactivating one or more positioning algorithms and/or one or more positioning systems (or part thereof) when they are unavailable (and/or when they meet one or more inaccuracy criteria), electrical power can be saved.

In one embodiment, the retrieved data defines a plurality of subregions within the indoor region.

Preferably, the GDDPM is further configured to: determine a relationship between a or the device and an electromagnetic signal source using the retrieved data, the device being located in a first subregion of the indoor region and the electromagnetic signal source being located in a second subregion of the indoor region; and to associate a weighting with signal(s) received by the device from the electromagnetic signal source, or with data derived therefrom, the weighting being dependent on said relationship.

As described above with respect to the first aspect of the invention, the relationship between the first subregion and the second subregion may comprise a quantity of subregions between the first subregion and the second subregion. Additionally or alternatively, the relationship between the first subregion and the second subregion may comprise a quantity and/or type and/or material of walls between the first subregion and the second subregion. Additionally or alternatively the relationship between the first subregion and the second subregion may comprise a signal propagation characteristic (e.g. path loss coefficient) relating to the propagation of electromagnetic signals between the first and second subregions.

Typically, the said positioning system module is configured to obtain electromagnetic signal source data relating to the said electromagnetic signal source. As described above the electromagnetic signal source data may comprise one or more characteristics of the said electromagnetic signal source and/or electromagnetic signal source location data comprising the position of the said electromagnetic signal source. It may be that the location data relating to the position of the device and the electromagnetic signal source location information relating to the position of the electromagnetic signal source are compared with the retrieved data from the database of location specific geographical descriptive data to identify the relevant subregions between the device and the said electromagnetic signal source.

The geographical descriptive data processing module may be further configured to predict one or more possible future positions of a or the device using the retrieved data; and to compare the one or more predicted possible future positions of the device with a or the provisional estimated position of the device provided by the location data in order to determine whether the provisional estimated position of the device matches one of the predicted possible future positions.

Typically, the GDDPM is further configured to measure or obtain a (typically average, e.g. mean) speed of the device; and to predict said one or more possible future positions of the device using both the speed of the device and the retrieved data.

The GDDPM may be further configured to measure or obtain a direction of movement of the device and to predict said one or more possible future positions of the device using the direction of movement of the device (and typically also the retrieved data and additionally or alternatively the speed of the device).

Preferably, the GDDPM is further configured to adjust the provisional estimated position of the device to match (or at least such that the provisional estimated position of the device is adjusted to become closer to) one of the predicted possible future positions in response to a determination that the provisional estimated position does not match one of the predicted possible future positions.

It will be understood that if there is only a small discrepancy between the provisional position and one of the predicted possible future positions, it may be that the provisional position of the device is not adjusted. That is, the GDDPM may be configured to adjust the provisional position of the device to match (or at least such that the provisional estimated position of the device is adjusted to become closer to) one of the predicted possible future positions in response to a determination that the difference between the provisional position and the closest predicted possible future position is greater than a threshold.

The indoor region may comprise the interior of a building.

Preferably, the geographical descriptive data processing module is configured to: select a second indoor region dependent on second location data relating to an updated position of the device; retrieve geographical descriptive data specific to the second indoor region from the database; and to subsequently estimate a second position of the device taking into account the retrieved data specific to the second indoor region and/or to output data from the retrieved data specific to the second indoor region data which can be used to estimate a second position of the device.

The GDDPM may be further configured to validate or invalidate a determination that the device has moved from the first indoor region to the second indoor region (i.e. to determine whether a movement from the first indoor region to the second indoor region is valid). In this case, the GDDPM may be configured to subsequently estimate a second position of the device taking into account the retrieved data specific to the second indoor region and/or to output data from the retrieved data specific to the second indoor region data which can be used to estimate a second position of the device in response to a validation of the determination that the device has moved from the first indoor region to the second indoor region.

Validating or invalidating the determination that the device has moved from the first indoor region to the second indoor region may comprise, for example, determining whether the device has passed through or interacted with a topological feature (e.g. an elevator, escalator, staircase, passageway, doorway or the like) linking the indoor region and the second indoor region. This may be done, for example, by comparing movements of the device with one or more reference movement patterns as described above. In another example, validating or invalidating the determination that the device has moved from the first indoor region to the second indoor region may comprise checking one or more constraints provided by the retrieved data (or data derived therefrom) to determine whether there is a passable route from the indoor region to the second indoor region.

The GDDPM may be configured to estimate the second position of the device taking into account the retrieved data specific to the (first) indoor region and/or to output data from the retrieved data specific to the (first) indoor region data which can be used to estimate a second position of the device in response to an invalidation of the determination that the device has moved from the first indoor region to the second indoor region.

Typically, the GDDPM is further configured to receive the second location data.

Typically, the GDDPM is further configured to retrieve the geographical descriptive data specific to the second indoor region from the database of location specific geographical descriptive data in response to receipt of said second location data and selection of the second indoor region.

That is, the data processing apparatus allows for switching between subregions of an indoor region and/or between indoor regions, the GDDPM being configured to update the retrieved data in accordance with a subregion/indoor region selected by the second location data. As above, the second location data may comprise a position of the device or it may simply identify the second indoor region.

As indicated above, preferably, the data processing apparatus further comprises a positioning system module for estimating the position of a device, the positioning system module being in communication with the geographical descriptive data processing module.

The positioning system module may be provided on the device.

The positioning system module may be provided on the same device as the GDDPM (e.g. both modules may be provided on a mobile smartphone) and/or the database. However, alternatively the GDDPM and the positioning system module may be provided on different devices. In this case the GDDPM and positioning system module may be configured to communicate via a data communications network. The positioning system module may be in communication with the database, but typically data is retrieved from the database by the GDDPM which is also configured to transmit said data to the positioning system module.

Typically, the positioning system module comprises a wireless receiver.

Typically the wireless receiver comprises a Wi-Fi receiver, Bluetooth receiver, Zigbee receiver, near field communications receiver and/or a satellite positioning system receiver.

Preferably, the positioning system module is configured to process positioning signals received by one or more wireless receivers to determine a position of the position estimating device.

In one example, the positioning system module is configured to receive electromagnetic signals transmitted by one or more electromagnetic signal sources; obtain electromagnetic signal source data relating to the one or more electromagnetic signal sources (e.g. from a database of electromagnetic signal source data and/or by processing electromagnetic signals transmitted by the said electromagnetic signal sources comprising said data); and process (e.g. triangulate) the received electromagnetic signals or data derived therefrom, the obtained electromagnetic signal source data and the retrieved data from the database of location specific geographical descriptive data to estimate (typically by calculating an estimation of) the position of the device. In this case, the GDDPM is typically in electronic communication with the positioning system module, and the GDDPM is configured to transmit the retrieved data from the database of location specific geographical descriptive data to the positioning system module.

Typically the electromagnetic signal source data comprises the (e.g. (estimated) relative or absolute) positions of the said electromagnetic signal sources. The electromagnetic signal source data may further comprise one or more characteristics of the said electromagnetic signal sources.

The GDDPM may be configured to retrieve one or more electromagnetic signal propagation characteristics from the database of location specific geographical descriptive data relating to (or describing the nature of electromagnetic signal propagation within) the indoor region. The positioning system module may be configured to use the said one or more electromagnetic signal propagation characteristics when processing the received electromagnetic signals or data derived therefrom together with the obtained electromagnetic signal source data to estimate (or calculate and estimation of) the position of the device.

Preferably, the positioning system module comprises a sensors module.

The sensors module may comprise one or more sensors for generating positioning data.

The sensors module may comprise an accelerometer for measuring a vertical acceleration of the device, thereby generating vertical acceleration data and/or a compass and/or a gyroscope for measuring an orientation of the device, thereby generating orientation data.

The positioning system module may be configured to process the vertical acceleration data and the orientation data to estimate a position of the device (typically in combination with an initial position which may be determined by any suitable method).

The positioning system module may be configured to transmit location data to the geographical descriptive data processing module, and the geographical descriptive data processing module may be configured to provide the positioning system module with data from the retrieved data or data derived from the retrieved data which can be used by the positioning system module to estimate the position of the device.

The location data may comprise a provisional estimated position of a or the device provided by the positioning system module, and the GDDPM may be configured to adjust the provisional estimated position of the device in accordance with the retrieved data.

Typically, the positioning system module is configured to perform the said pattern recognition algorithm(s). In this case, the GDDPM is preferably configured to transmit a reference movement pattern to the positioning system module in response to a determination that the provisional estimated position of the device is within a said predefined zone.

In one embodiment, the geographical descriptive data processing module is configured to activate and/or deactivate operation of the positioning system module in response to a determination that the device has entered and/or left one of the said predefined zones. Additionally or alternatively, the geographical descriptive data processing module may be configured to activate and/or deactivate operation of one or more additional positioning system modules in response to a determination that the device has entered and/or left one of the said predefined zones.

A third aspect of the invention provides a computer readable medium storing computer executable code which when executed on a data processing apparatus causes the data processing apparatus to perform in accordance with the method according to the first aspect of the invention.

A fourth aspect of the invention provides a computer readable medium storing computer executable code which when executed on a data processing apparatus causes the data processing apparatus to perform in accordance with the data processing apparatus according to the second aspect of the invention.

A fifth aspect of the invention provides mobile device comprising the data processing apparatus according to the second aspect of the invention.

A sixth aspect of the invention provides a mobile device configured to perform the method according to the first aspect of the invention.

Although the embodiments of the invention described with reference to the drawings comprise methods performed by computer apparatus, and also computing apparatus, the invention also extends to program instructions, particularly program instructions on or in a computer readable storage medium, adapted for carrying out the processes of the invention or for causing a computer to perform as the computer apparatus of the invention. Programs may be in the form of source code, object code, a code intermediate source, such as in partially compiled form, or any other form suitable for use in the implementation of the processes according to the invention. The computer readable storage medium may be any tangible entity or device capable of carrying the program instructions.

For example, the computer readable medium may be a ROM, for example a CD ROM or a semiconductor ROM, or a magnetic recording medium, for example a floppy disc or hard disc.

The preferred and optional features discussed above are preferred and optional features of each aspect of the invention to which they are applicable. For the avoidance of doubt, the preferred and optional features of each aspect of the invention are also preferred and optional features of all of the other aspects of the invention, where applicable.

DESCRIPTION OF THE DRAWINGS

An example embodiment of the present invention will now be illustrated with reference to the following Figures in which:

FIGS. 6A and 6B show the floorplans of two floors of a building;

FIG. 6C shows the floorplan of one floor of a building, but where different subregions of the floor have different electromagnetic signal propagation characteristics;

FIGS. 7A-7C illustrate a reference pattern used to determine whether a device has ascended or descended a staircase;

FIGS. 10A and 10B illustrate raw and low-pass-filtered vertical acceleration data respectively;

DETAILED DESCRIPTION OF AN EXAMPLE EMBODIMENT

Figure 1:
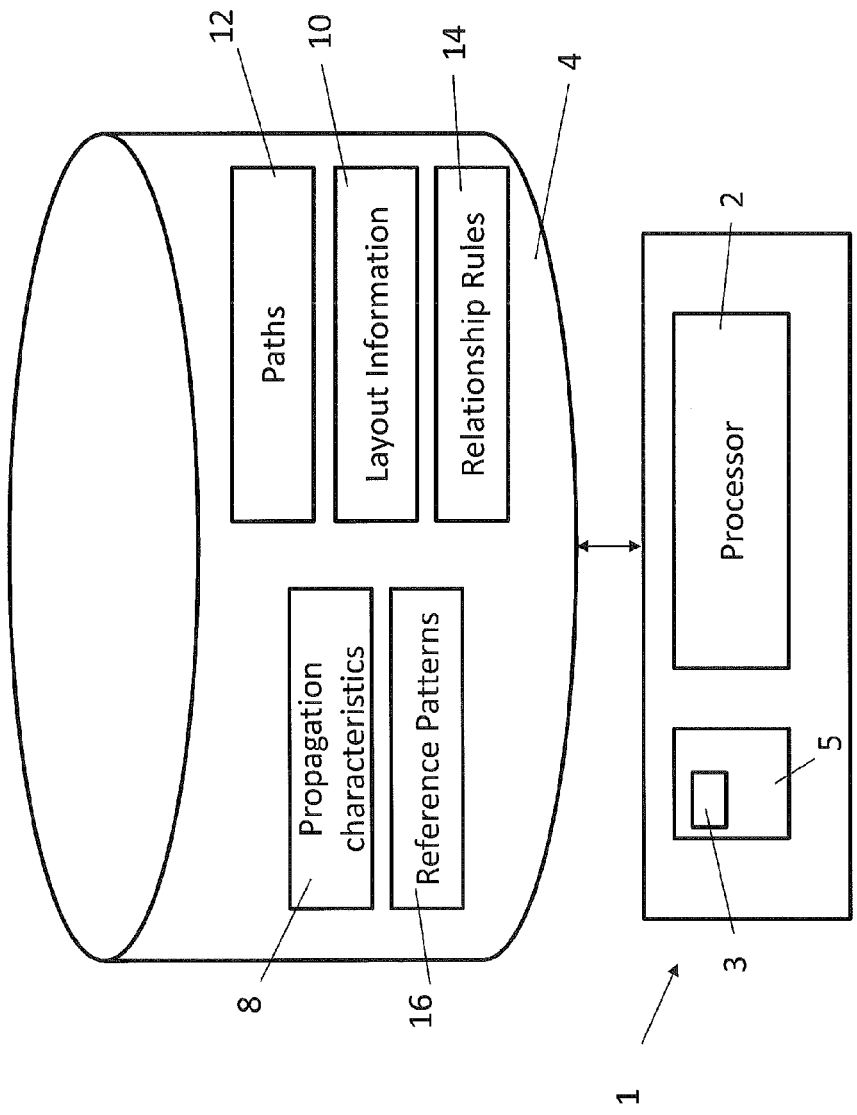
FIG. 1 is a block diagram of a GDDPM in communication with a database.

FIG. 1 is a block diagram of a Geographical Descriptive Data Processing Module (GDDPM) 1 for improving the execution of one or more positioning system modules (e.g. a satellite positioning module, a triangulation-based positioning module, a positioning module based on identifying fingerprint data from electromagnetic signal sources of known position, or any other suitable positioning system modules) for estimating the position of a device (such as a mobile smartphone or stationary electromagnetic signal source). The GDDPM 1 comprises program code 3 stored on a memory 5 in electronic communication with, and executed by, a processor 2, and one or more inputs. The GDDPM 1 is in communication with a database 4. The database 4 comprises location specific geographical descriptive data relating to one or more indoor regions comprising an interior of a building. More specifically, the database 4 comprises propagation characteristic information 8, and/or topological information, such as layout information 10, path information 12 or relationship rules 14, and/or reference movement patterns 16, which are discussed further below.

At least one input of the GDDPM 1 is configured to receive requests from one or more positioning system modules for geographical descriptive data specific to an indoor region dependent on location data provided in the request for use by the positioning system module issuing the request to estimate the position of the device. On receipt of such a request, the processor 2 is configured to provide the positioning system module with geographical descriptive data specific to said indoor region from the database 4. Additionally or alternatively, at least one input of the GDDPM 1 is configured to receive a provisional estimated position of the device from one or more positioning system modules. On receipt of a provisional estimated position of the device, the processor 2 is configured to adjust the provisional estimated position provided by the positioning system module in accordance with geographical descriptive data specific to the said indoor region obtained from the database 4. This adjusted position may be sent back to the positioning system module, displayed and/or logged in a memory.

The GDDPM 1 and the database 4 may both be provided on a server. In this case, the device being used to estimate a position (e.g. its own position or the position of, for example, an electromagnetic signal source) may be configured to communicate with the GDDPM 1 and the database 4 via a data communications network such as a mobile telecommunications network or via the internet (e.g. via a wired connection, or via Wi-Fi or Wi-MAX access points), the GDDPM 1 and database being configured to communicate with each other via one or more signal busses internal to the server. Alternatively, the GDDPM 1 may be provided on the device being used to estimate a position and the database 4 may be provided on a server computer, in which case the GDDPM 1 and the database may be configured to communicate via a data communications network, while a processor of the device may be configured to communicate with the GDDPM 1 via one or more signal busses internal to the device. Alternatively, the GDDPM 1 may be provided on the device together with a cache memory, while the database 4 is provided on a server. In this case, data may be retrieved by the GDDPM 1 from the database 4 and stored in the cache memory, where it can be accessed by the device (or by the GDDPM 1 and subsequently sent to a processor of the device) and used to estimate a position. In another alternative, the database 4 and GDDPM 1 are provided on the device, in which case the database 4 and GDDPM 1 are configured to communicate with each other and a processor of the device via signal busses internal to the device.

Layout Information and Path Data

As indicated above, and as illustrated by FIGS. 2 to 5, the database 4 typically comprises layout information 10. The layout information typically describes spatial relationships between two or more physical features within the indoor region. Typically the layout information identifies passable and impassable sections or features within one or more indoor regions. For the purposes of the description below, a single indoor region 30 will be referred to and it will be assumed that the indoor region 30 is the interior of a building.

Figure 2:
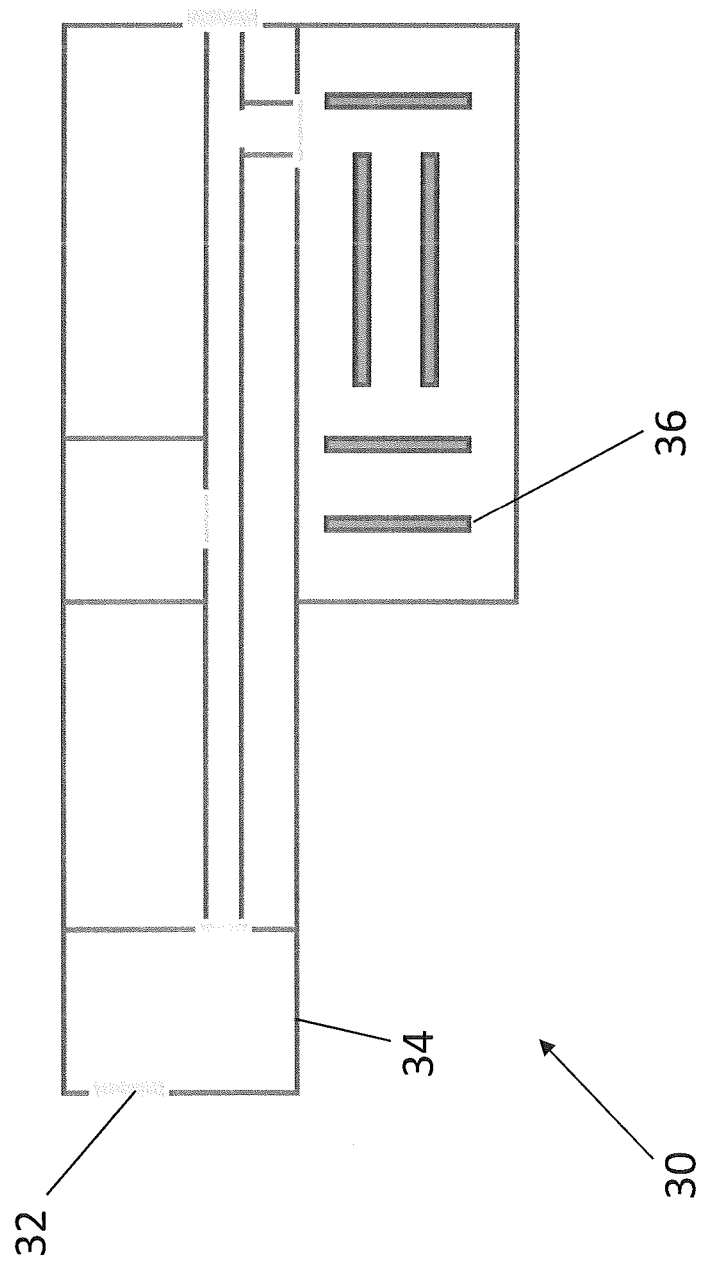
FIG. 2 is the layout of an indoor region which may be provided by the database of FIG. 1.

With reference to FIG. 2, the layout information 10 may comprise a digitized blueprint, map or floorplan indicating the positions of topological features such as doorways 32, structural walls 34, partitioning walls 36, the ends of corridors, stairways, escalators, travelators (i.e. moving walkway), elevators and the like. These topological features implicitly identify passable and/or impassable sections within the indoor region. For example, structural or partitioning walls 34, 36 provide boundaries between which passable sections are provided. The walls themselves are impassable, other than through portals such as doorways 32. This information can be used to adjust a provisional estimated position of the device provided by a positioning system module. For example, a provisional estimated position of the device may be compared to a prior estimated position of the device together with the layout information to determine whether the device has followed a passable route between the prior estimated position and the provisional estimated position. If it has been determined that the device would have need to have followed an impassable route to move from the prior position to the provisional estimated position, the provisional estimated position of the device may be adjusted to a position reachable from the prior position via a passable route within the indoor region in accordance with the layout information 10.

Figure 3:
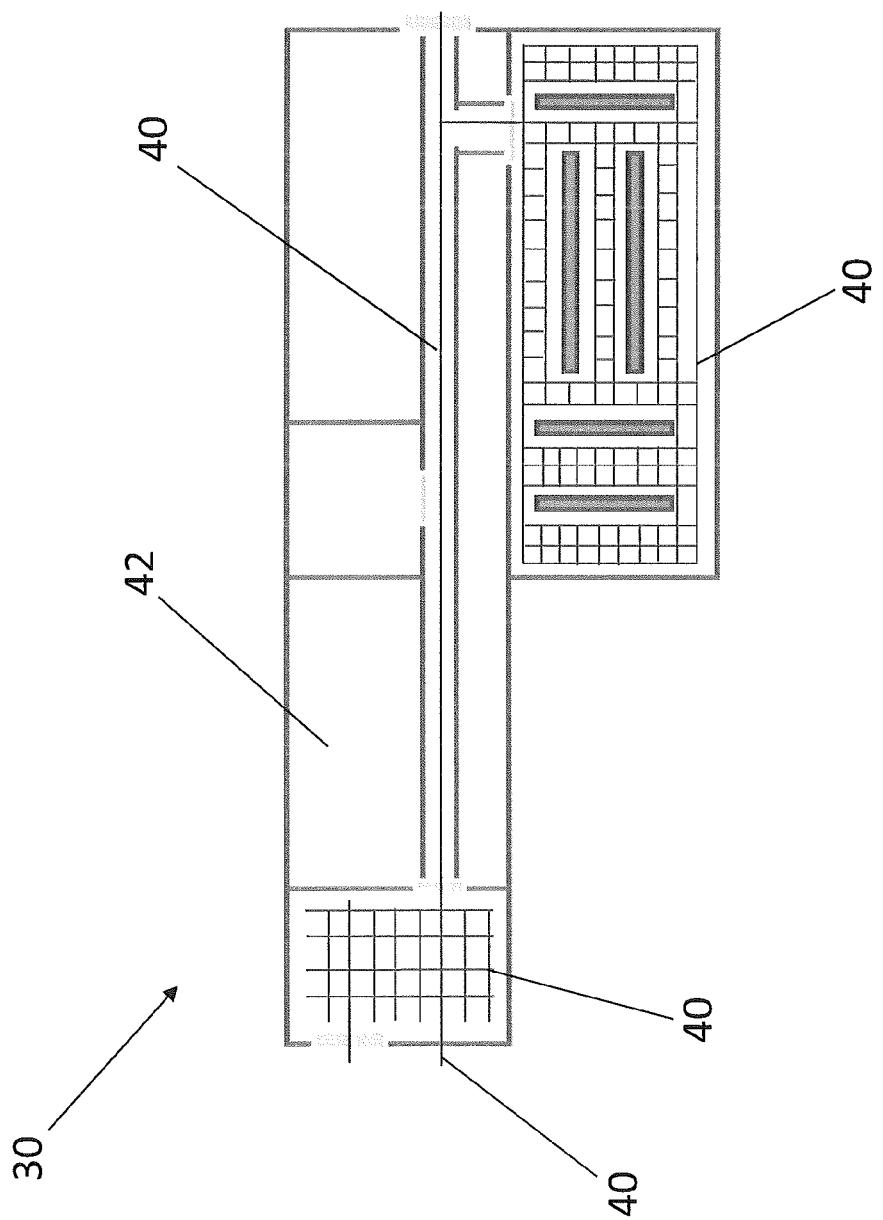
FIG. 3 is the layout of FIG. 2 with path information derived from a blueprint, map or floorplan of the indoor region.
Figure 4:
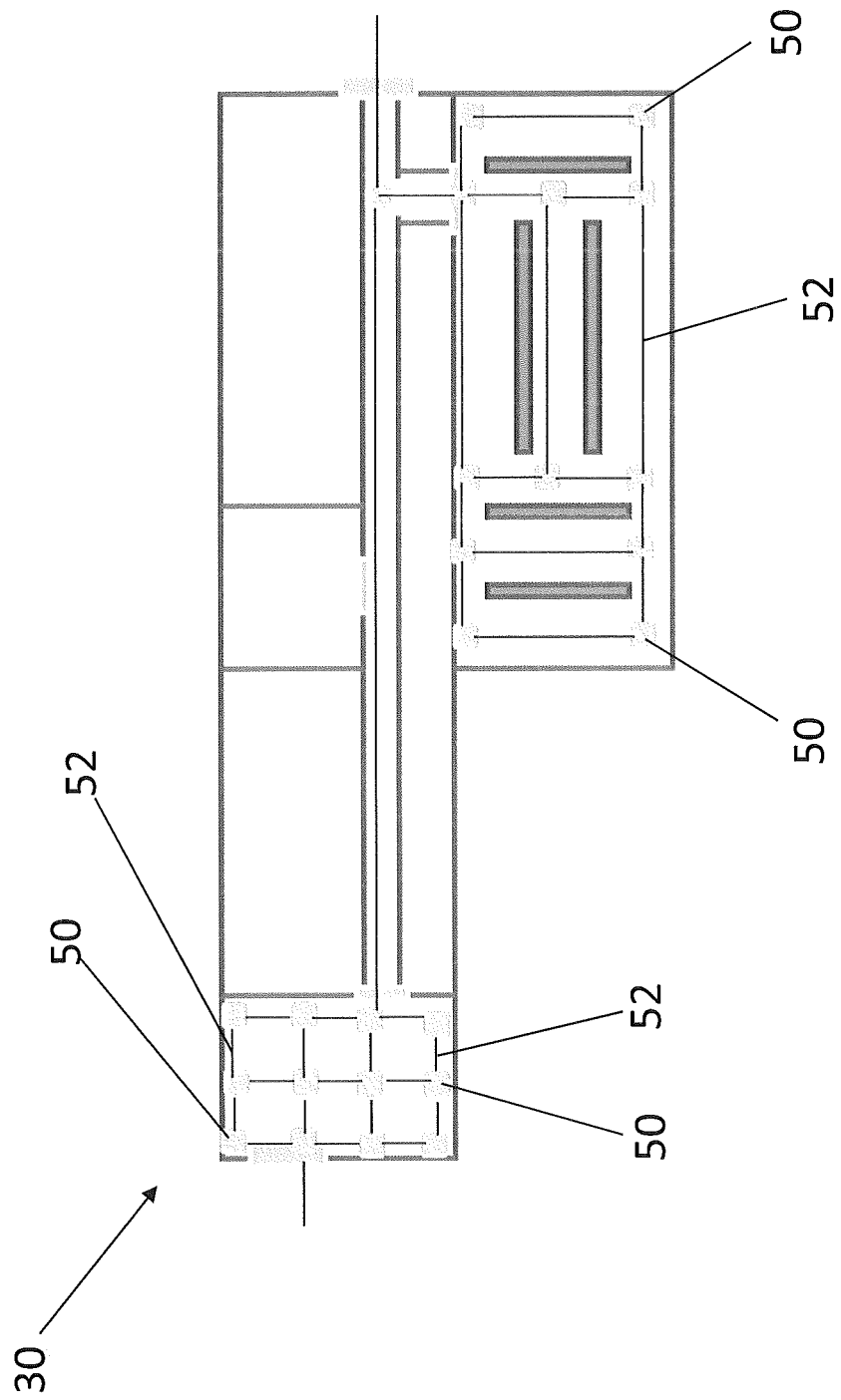
FIG. 4 is the layout of FIG. 2 with lower resolution path information.
Figure 5:
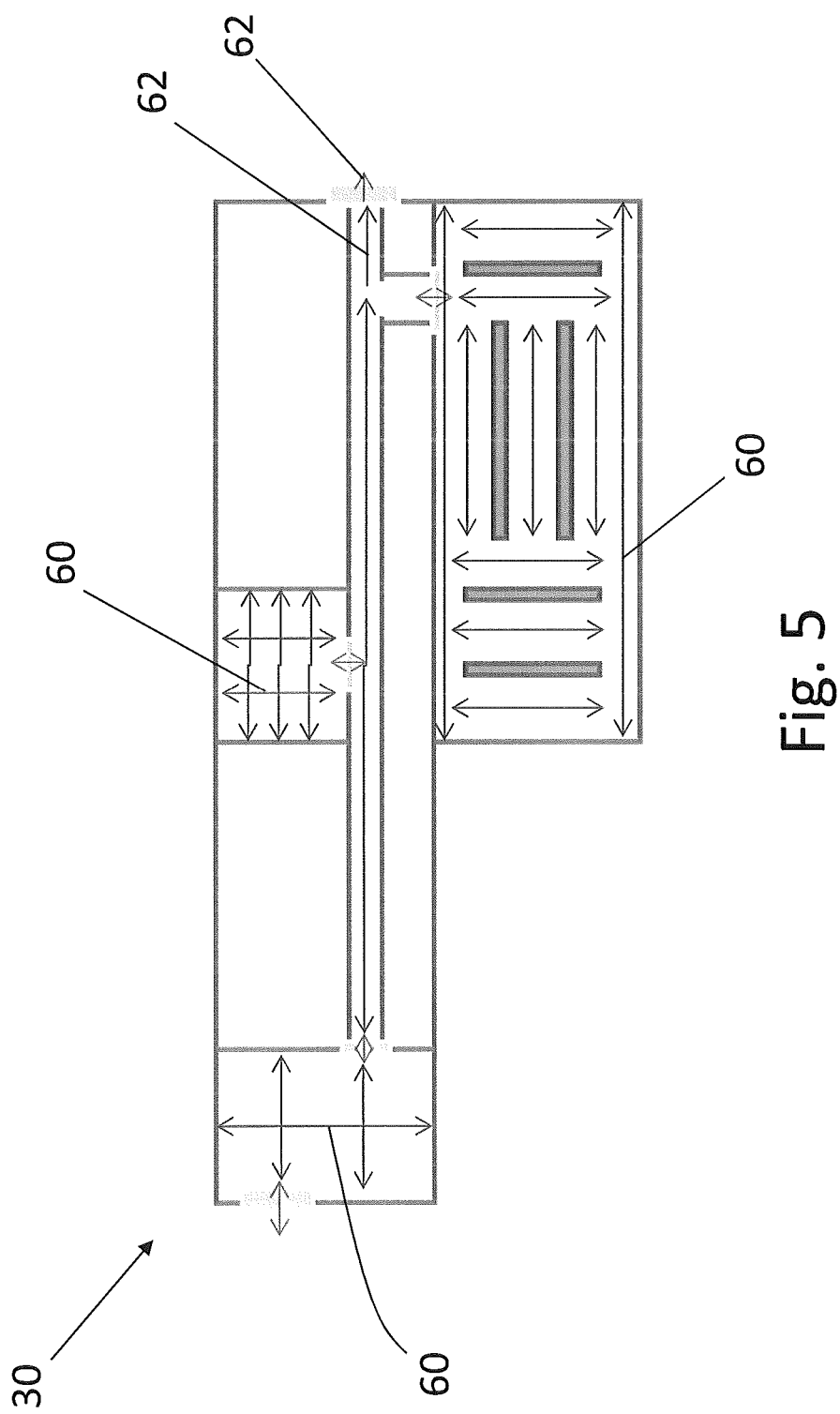
FIG. 5 is the layout of FIG. 2 having directional path information.

With reference to FIGS. 3-5, path data 12 may also be provided, said path data being associated with the layout information 10. In the example of FIG. 3, the path data 12 may comprise a plurality of path lines 40, each path line defining a range of possible positions of the device along a particular passable route within the indoor region 30 which may be followed by a portable device or occupied by a stationary electromagnetic signal source. These path lines 40 are typically interconnected and may be derived directly from a digitized blueprint or map describing the layout of the indoor region 30. Alternatively, the path lines 40 may be derived from data captured and stored from one or more reference devices having previously followed those paths within the indoor region 30. The path lines 40 can be seen as example routes which may be followed by a device within the indoor region.

The path lines 40 may extend between different floors of a building, and even between different buildings. In some cases, path lines on a first floor of the building may be interconnected to path lines on a second floor of the building, such that the path lines are interconnected in three dimensions. The path lines on the first floor may be interconnected to the path lines on the second floor via one or more topological features, such as elevators, escalators, staircases, ramps and so on.

As shown in FIG. 3, some rooms 42 within the indoor region 30 do not have any path lines 40. This may be indicative that rooms 42 are impassable by the general public and relate for example to private offices or storerooms for electrical equipment.

The path lines 40 can be used to adjust a provisional estimated position provided by a positioning system module. For example, if a device is initially estimated by a positioning system module to be located at a position not lying on a particular path line 40, the provisional estimated position can be adjusted by the processor 2 of the GDDPM 1 to lie on a path line 40. Typically, the provisional estimated position would be adjusted to the closest position to the provisional estimated position lying on a path line 40.

FIG. 4 illustrates an alternative method of deriving paths within the indoor region. In this case, a plurality of nodes 50 may be defined within the indoor region, and a plurality of path lines 52 may be defined, each path line 52 defining a range of possible positions of the device along a particular passable route between a respective pair of nodes 50. It will be understood that the nodes 50 and path lines 52 provide similar information to the path lines 40 as described above with reference to FIG. 3, however the path lines 52 are typically of lower resolution to path lines 40.

With reference to FIG. 5, path lines 60, 62 may be provided which contain directional information as well as positional information. In this case, the paths may provide directional constraints as well as positional constraints. As shown in FIG. 5, some path lines 60 are illustrated by double headed arrows. This indicates that a user may carry the device in either direction along that path line 60. As also shown in FIG. 5 other paths in 62 are illustrated by single headed arrows. This indicates that a user may carry the device along only one direction along that path line 62. A unidirectional path line 62 may be useful to indicate a dedicated entrance/exit, or a travelater or escalator moving in a particular direction, for example, within the indoor region.

The directional path lines 60, 62 can be used to adjust a provisional estimated position provided by a positioning system module. For example, if a device is initially estimated to be moving in the wrong direction along a particular path line, the provisional estimated position can be adjusted by the processor 2 of the GDDPM 1 to a position following an allowed direction on, for example, an alternative (e.g. parallel) path line closest to the initial position estimate.

Other constraints may be defined in the layout/path information. For example, one or more constraints may be provided which define possible and impossible positions of the device. The constraints may be specific to a particular device (e.g. a portable personal electronic device may be subject to different constraints than a stationary electromagnetic signal source). Thus, the geographical descriptive data specific to the indoor region may also be specific to the particular type of device whose position is being estimated. For example, the device whose position is being estimated may be an electromagnetic signal source, and a constraint may be provided which states that an electromagnetic signal source cannot be positioned in the middle of a road provided, for example, in a tunnel. In this case, if a provisional estimated position of the electromagnetic signal source does not comply with the constraint (in this example, the electromagnetic signal is provisionally estimated to be positioned in the middle of the said road, the GDDPM may adjust the provisional estimated position to a position complying with the constraints. Preferably, the GDDPM adjusts the provisional estimated position to the closest position which complies with the constraints provided. It will be understood that such a constraint may not be applicable to a portable personal electronic device.

Relationship Rules

As indicated above with reference to FIG. 1, the constraints provided by the GDDPM 1 may also comprise one or more relationship rules 14 which specify whether the device can move between particular subregions of an indoor region (or between adjacent indoor regions). The relationship rules 14 can be used by the GDDPM 1 to adjust a provisional estimated position of a device (which may be provided by a positioning system module such as a satellite positioning system module or a positioning system module based on the processing of electromagnetic signal sources of known position) which does not comply with one of the rules to a position which does comply with one of the rules.

One or more of the relationship rules 14 may be (but are not necessarily) direction specific—i.e. the one or more of the relationship rules may specify whether the device can move between particular subregions (or between adjacent indoor regions) in a particular direction and/or along a particular path. For example, a rule may specify that the device cannot travel from a first subregion of an indoor region to a second subregion of the indoor region along a moving walkway which provides a unidirectional path from the second subregion to the first subregion. In another example, one or more relationship rules 14 may be provided which specify that the device cannot enter the indoor region through a dedicated exit. The position of the device may be adjusted by the GDDPM 1 to lie on another (e.g. parallel) path, or at an alternative position, close to the provisional estimated position. Preferably the provisional estimated position is adjusted to the closest possible position within the indoor region.

It will be understood that, in order to determine whether a provisional estimated position breaks one or more relationship rules 14, the GDDPM 1 may be required to compare the provisional estimated position with a prior estimated position of the device. Thus, the GDDPM 1 may be configured to cache positional data (e.g. data provided by positioning system modules and/or adjusted positioning data provided by the GDDPM 1) in a memory.

Reference Movement Patterns

The database 4 of the GDDPM 1 may further comprise one or more reference movement patterns 16 consistent with the use of one or more topological features such as doorways, the ends of corridors or staircases. Each reference movement pattern is associated with a particular topological feature. One or more of the reference movement patterns 16 may comprise a plurality of successive positions (typically in a specified order) which may be expected to be occupied by a device passing through or interacting with the topological feature with which the pattern is associated. Additionally or alternatively, one or more of the reference movement patterns 16 may comprise two or more motion vectors, typically in a specified order, which may be expected to be followed by a device passing through or interacting with the topological feature with which the pattern is associated.

An exemplary reference movement pattern for detecting use of a staircase 210 is illustrated in FIGS. 7A to 7C. FIGS. 7A and 7B are side and plan views of the staircase 210. In order to ascend the staircase from point A to point C, a device must move a first distance in one lateral direction (left on FIGS. 7A and 7B) before moving a second distance in an opposite lateral direction (right on FIGS. 7A and 7B). Accordingly, a reference pattern comprising a motion vector representative of movement of the first distance in the said one lateral direction and a second motion vector representative of the second distance in the said opposite lateral direction may be defined and associated with the staircase 210. This reference pattern is illustrated by FIG. 7C.

Some additional movements of the device may be allowed between the successive lateral movements to account for a landing (e.g. at point B) between the left and right parts of the staircase 210. This is illustrated in FIG. 7B which shows a movement perpendicular to the said lateral movements, between the said lateral movements. Optionally this perpendicular movement may be provided as part of the reference movement pattern.

Time constraints may also be applied within which the first distance in said one lateral direction and/or said second distance in said opposite lateral direction must be travelled by the device for a "match" to be detected between the movements of the device and the reference pattern.

An alternative reference movement pattern may comprise a plurality of positions and/or a plurality of motion vectors in a specified order representative of the device moving through a (e.g. 90°) turning point. Such a reference movement pattern may be representative of the movements expected by a device moving through a portal, such as a doorway, or changing directions at the end of a corridor.

The reference patterns 16 also typically comprise data defining one or more zones around respective one or more topological features. A positioning system module may be adapted to transmit an estimated position of a device to an input of the GDDPM 1 which compares the estimated position to the data defining the zones. The processor 2 of the GDDPM 1 may be configured to alert the positioning system module when the device has entered a zone associated with a topological feature and that there is at least one reference pattern available at the GDDPM 1 in respect of that zone. The positioning system module may also be adapted to receive such an alert from the GDDPM 1. The alert from the GDDPM 1 received by the positioning system module activates the positioning system module to execute a pattern recognition algorithm. As part of the pattern recognition algorithm, the positioning system module requests the reference pattern from the GDDPM 1 and compares movements of the device with the reference pattern provided by the GDDPM 1.

If movement of the device matches the reference movement pattern, the estimated position of the device can be corrected to a position at or adjacent to the known position of the topological feature associated with the reference pattern (either by the GDDPM 1 or the positioning system module). Typically, the estimated position of the device is corrected to a position at or adjacent to the topological feature which lies on a path provided in the path data 12 of the database 4. For example, the position of the device may be adjusted to a position at the top or bottom of the staircase 210.

The processor 2 of the GDDPM 1 may also be configured to alert the positioning system module when the device is outside of the zone, which causes the positioning system module to deactivate execution of the pattern recognition algorithm associated with the topological feature of the zone which the device has left.

By enabling (activating) and disabling (deactivating) execution of the pattern recognition algorithms when the device enters or leaves the predefined zones respectively, electrical power is saved and false detections are minimised.

Complete conformance of the estimated movements of the device and the reference movement pattern may not be necessary. In some embodiments, a minimum error (e.g. least squares error) algorithm may be employed to determine whether a reference pattern matches the movements of the device. In some cases, the minimum error must be less than an error threshold for a conformance to be determined.

Source Characteristics

As indicated above, and as will be explained in more detail in the examples below, a positioning system module may be employed to estimate the position of a device by processing electromagnetic signals received by the device from one or more electromagnetic sources of known location within the indoor region. A positioning system module may alternatively be employed to estimate the position of one or more electromagnetic signal sources by processing electromagnetic signals received from the said one or more electromagnetic signal sources by a receiving device of known location. The location of the receiving device may be estimated by an alternative positioning system such as satellite positioning. However, in the discussion below, it will be assumed that it is the device receiving the electromagnetic signals whose position is being estimated.

A database of source characteristics may be provided in data communication with the positioning system module, the database storing one or more source characteristics of one or more electromagnetic signal sources located (or detectable) within one or more indoor regions which can be used by such a positioning system module. The electromagnetic signal sources are typically (e.g. Wi-Fi or Bluetooth) wireless access points (WAPs) or radio beacons, but may be any suitable electromagnetic signal sources. These characteristics typically identify parameters of the electromagnetic signal sources. For example, the source characteristics may comprise identifiers (such as MAC addresses) of a plurality of electromagnetic signal sources located within the indoor region(s). The database of source characteristics also typically stores the locations of the said electromagnetic signal sources.

Following receipt of a suitable request by such a positioning system module, the database of source characteristics may provide source characteristics relating to one or more sources located (or detectable) within a specified indoor region for use by the positioning system module to estimate the position of a device receiving electromagnetic signals from one or more of the said sources.

The database may be provided on a server computer or alternatively (although shown in FIG. 1 as being separate from the device) the database of source characteristics may be provided on a memory of the device.

Propagation Characteristics

As indicated above, the database 4 of the GDDPM 1 also typically comprises propagation characteristics 8 relating to the propagation characteristics of electromagnetic signals propagating within the one or more indoor regions.

There are various electromagnetic signal propagation models which can be used to describe the propagation of electromagnetic signals within an environment. The most appropriate propagation model for a given situation is typically dependent on the environment in which the electromagnetic signals propagate. Accordingly, the propagation characteristics 8 typically comprise one or (preferably) more electromagnetic signal propagation models (for example path loss models or signal pattern equations) for estimating the variation of electromagnetic signal strength within one or more indoor regions and/or parameters (e.g. path loss coefficients) for use therein.

Some electromagnetic signal propagation models use only received signal strength and the distance from the electromagnetic signal source, while other more sophisticated models use parameters such as angle of incidence and the refractive index of the materials used in the indoor region. An electromagnetic signal propagation model which uses received signal strength, the distance from the electromagnetic signal source and a path loss coefficient specific to the environment is as follows:

$$L_d = L_{d0} - 10\alpha \log(d/d_0)$$

where: $L_d$ is the path loss at distance d
$L_{d0}$ is the path loss at a reference distance $d_0$
$\alpha$ is the path loss coefficient specific to the environment For indoor regions comprising a relatively large amount of open space, a simple propagation model may be more appropriate for predicting the expected propagation characteristics of an electromagnetic signal because simple propagation models require less computation. However, for indoor regions comprising partitioning walls, ceilings and so on through which the electromagnetic signals are required to propagate, it may be more appropriate to use more sophisticated models such as the one described above.

Appropriate path loss coefficients, $\alpha$, may be included in the propagation characteristics 8 of the database 4 for specific indoor regions. For example, a first path loss coefficient $\alpha_a$ may be provided for a first indoor region and a second path loss coefficient $\alpha_b$ may be provided for use with respect to a second indoor region. Following receipt of a request from the positioning system module for geographical descriptive data specific to a particular indoor region, the path loss coefficient appropriate for that indoor region may be selected by the processor 2 of the GDDPM 1, based on, for example, a current (or a prior) estimated location of the device and/or an estimated location of the electromagnetic signal source (which may be obtained from the source characteristics database or obtained from signals transmitted by the electromagnetic signal source comprising the said location). The appropriate path loss coefficient may then be provided to the positioning system module to estimate the position of a device receiving electromagnetic signals from the electromagnetic signal source. As above, it will be understood that the positioning system module may alternatively be employed to estimate the position of the electromagnetic signal source by processing electromagnetic signals received from the said one or more electromagnetic signal sources by a receiving device of known location. The location of the receiving device may be estimated by an alternative positioning system such as satellite positioning. However, in the discussion below, it will again be assumed that it is the device receiving the electromagnetic signals whose position is being estimated.

If both the device receiving the electromagnetic signals and the electromagnetic signal source were estimated to be located in the first indoor region, the first path loss coefficient $\alpha_a$ may be selected by the processor 2 from the database 4. The selected path loss coefficient may then be provided to the positioning system module to estimate the position of the device receiving the electromagnetic signals or the position of the electromagnetic signal source itself. By using a location specific path loss coefficient, the accuracy of the position estimate provided by the positioning system module is improved.

For more complex indoor regions, a plurality of path loss coefficients, $\alpha$, may be provided to take into account different electromagnetic propagation properties of different subregions within the indoor regions. As shown in FIGS. 6A and 6B, an indoor region such as the interior of a building may comprise a plurality of floors 70, 72. In this case a first path loss coefficient, $\alpha_1$, may be provided by the GDDPM for use with respect to a first-floor 70 and second path loss coefficient $\alpha_2$ may be provided by the GDDPM for use with respect to the second floor 72. Additionally or alternatively, as shown in FIG. 6C, a plurality of path loss coefficients may be provided by the GDDPM for use with respect to a corresponding plurality of subregions within (e.g. a single floor of) an indoor region. In the example of FIG. 6C, a first path loss coefficient $\alpha_A$ may be provided for use with respect to a first room 74, a second path loss coefficient $\alpha_B$ may be provided for use with respect to a corridor 76 and a third path loss coefficient $\alpha_C$ may be provided for use with respect to second room 78. It will be understood that the rooms and/or the corridor may be further subdivided, with additional path loss coefficients being defined for each subdivision of the subregions. It will also be understood that path loss coefficients may be derived for some or all of the other rooms in the indoor region.

If an electromagnetic signal source is located at a first subregion of an indoor region, and the device receiving the electromagnetic signals transmitted therefrom is located at a second subregion of an indoor region, one or more additional subregions may be positioned between the device and the electromagnetic signal source, each of which may have different properties which affect the propagation of electromagnetic signals. For example, a plurality of subregions between the device and the electromagnetic signal source (optionally including the first and second subregions) may have different path loss coefficients as described above. The processor 2 of the GDDPM 1 is configured to estimate the combined electromagnetic signal propagation properties of the propagation path between the device and the electromagnetic signal source, taking into account the different properties of the subregions.

The subregion in which the electromagnetic signal source is located may be known (e.g. from the source characteristics database), or it may be derivable from one or more signals transmitted by the electromagnetic signal source, and a current/prior position of the device may be used to estimate which subregion the device is in. Using this information, the relevant electromagnetic signal propagation data with respect to one or more propagation paths between the electromagnetic signal source and the device can be requested from, and provided by, the GDDPM 1 to the positioning system module.

By providing location specific path loss coefficient to the positioning system module, the accuracy of the position estimate determined by the positioning system module is improved.

Information concerning the electromagnetic signal propagation path between an electromagnetic signal source and the device receiving electromagnetic signals transmitted by the source can also be used to attach a greater significance to electromagnetic signals from which the position of the device can be more reliably estimated. For example, weightings may be associated with signals received from each electromagnetic signal source, the weightings being dependent on how many subregions are provided between the first and second subregions. These weightings may then be taken into account when the position of the device is derived from the electromagnetic signals it receives such that signals received from electromagnetic signal sources positioned with fewer subregions between them and the device make a greater contribution to the position estimate than signals received from electromagnetic signal sources positioned with more subregions between them and the device. The weightings are typically provided by the GDDPM 1 to the positioning system module for use in estimating the position of the device.

In one embodiment, if there is a relatively high number (e.g. five or more) subregions between the device and an electromagnetic signal source, a low weighting (e.g. one or even zero) may be associated with signals received from that signal source, thereby applying a low significance to (or even ignoring completely) those signals. Alternatively, if the electromagnetic signal source is located in a second subregion adjacent to (or the same as) the first subregion in which the device is located, a high weighting (e.g. five or ten) may be associated with the signals received from the electromagnetic signal source, thereby applying a high significance to those signals.

Additionally or alternatively, the weightings may be dependent on an average (e.g. mean) path loss coefficient of all the subregions between each electromagnetic signal source and the device (optionally including the first and second subregions). Additionally or alternatively, the weightings may be dependent on a combined electromagnetic signal propagation model (e.g. one or more equations describing how signals attenuate in the subregions between the device and each electromagnetic signal source) which takes into account the electromagnetic signal propagation properties of the subregions (e.g. number of and/or type and/or material of walls within the subregions) between each electromagnetic signal source and the device. Weightings based on the electromagnetic signal propagation characteristics of the subregions may be more accurate than using only the number of subregions between the device and the electromagnetic signal source because some subregions may be substantially transparent to electromagnetic signals (e.g. a subregion may be substantially open plan with no partitioning walls), in which case they may not significantly attenuate signals propagating through them. Additionally or alternatively, some subregions (which may be adjacent the subregion occupied by the device) may comprise topological features (such as structural walls) which significantly attenuate signals propagating through them. By taking into account these differences between subregions, more accurate weightings can be derived, thus further improving the accuracy of the estimated position of the device by the positioning system module. It will be understood that any suitable relationship between the first and second subregions may be used to derive the weightings.

The most appropriate path loss coefficient, $\alpha$, for a particular indoor region (or a particular subregion of the indoor region) typically depends on the structure of the (subregion of the) indoor region (e.g. open plan, brick or glass partitioning walls etc), and on which materials are used in the (subregion of the) indoor region (e.g. steel, concrete). The most appropriate path loss coefficients, $\alpha$, may also be dependent on which environmental propagation model is being used to describe electromagnetic signal propagation within the indoor region and/or which positioning algorithm is used by the positioning system module to estimate the position of the device receiving the electromagnetic signals within the indoor region.

Accordingly, the path loss coefficients, $\alpha$, may be estimated theoretically from known parameters (e.g. wavelength) of the electromagnetic signals transmitted by the electromagnetic signal sources of interest and from known parameters of the indoor region, such as the refractive indices of the structural materials used in the indoor region (and/or from known parameters of subregions of the indoor region). The propagation characteristics 8 provided by the GDDPM 1 may thus comprise environmental parameters typically including properties (e.g. refractive indices) of structural materials of the indoor region(s) (or subregions within the indoor regions) such as the outer walls, segmentation walls, ceilings and floors from which path loss coefficients can be derived. The propagation characteristics 8 may also indicate that the indoor region(s) (or subregions within the indoor regions) comprises open-space, largely absent of ceilings and/or segmentation walls (for example). The propagation characteristics 8 may also include estimated angles of incidence of the electromagnetic signals at the device receiving the electromagnetic signals.

It will be understood that, additionally or alternatively, the said environmental parameters may be used directly in some propagation models.

More preferably, however, the path loss coefficients (or the environmental parameters themselves) are derived from actual measurements made by one or more reference devices of electromagnetic signals received from the electromagnetic signal sources located in the indoor region, for example by curve fitting.

The propagation characteristics 8 of the database 4 may also store data from which one or more propagation characteristics of the indoor region may be derived. Such data may comprise indicators which can be used to select an appropriate path loss models/coefficients from a group of candidate path loss models/coefficients stored by the positioning system module. For example, the positioning system module may store a plurality of candidate path loss models and/or path loss coefficients and the database 4 may provide one or more reference indicators which can be used by the positioning system module to select one or more of the candidate electromagnetic signal propagation models and/or coefficients suitable for a particular indoor region. Additionally or alternatively, the propagation characteristics 8 may comprise an average (typically median) signal power which may be expected to be received in particular subregions of the indoor region from a given electromagnetic signal source. This information may be provided to a positioning system module which compares received signal powers from one or more electromagnetic signal sources of known location to the average signal powers provided by the database 4 to estimate which subregion it is currently occupying within the indoor region.

Moving Between Subregions and/or Indoor Regions

The processor 2 may be configured to receive a plurality of successive requests and/or a plurality of successive provisional estimated positions of the device from the positioning system module. In this case, the processor 2 may be configured to determine when the device has moved from a first indoor region to a second indoor region (or alternatively from a first subregion of an indoor region to a second subregion of that indoor region). This may be done, for example, by processing a request from the positioning system module and selecting the second indoor region (or the second subregion) based on location data provided in the request, or by comparing a provisional estimated position provided by the positioning system module with layout information relating to a plurality of indoor regions (or a plurality of subregions) to determine the indoor region in which the provisional estimated position is located. When the processor 2 detects that the device has moved from the first indoor region to the second indoor region (or from the first subregion to the second subregion), the processor 2 is further configured to transmit updated geographical descriptive data to the positioning system module specific to the second indoor region (or second subregion) on receipt of a request for the same and/or to adjust a provisional estimated position in accordance with geographical descriptive data specific to the second indoor region (or second subregion). This may involve updating the propagation characteristics 8, paths 12, layout information 10 and/or relationship rules 14 transmitted to the positioning system module. In addition, different reference patterns 16 may be made available to the device.

The processor 2 may also be configured to determine that a device has moved from an indoor region to an outdoor region (or vice versa), in which case the processor 2 may also be configured to update the propagation characteristics 8, paths 12, layout information 10 and/or relationship rules 14 transmitted to the positioning system module accordingly.

The processor 2 may also be configured to enable and/or disable one or more positioning system modules when the device moves from an outdoor region to an indoor region (or vice versa) or from a first indoor region to a second indoor region (or vice versa) or from a first subregion to a second subregion. For example, when the device moves from an outdoor region to an indoor region, a satellite positioning module may be disabled by the processor 2 of the GDDPM. Additionally or alternatively, the processor 2 of the GDDPM 1 may be configured to enable a positioning module which uses one or more internal sensors (see below) of a device when no electromagnetic signal sources of known position are visible in a particular indoor region.

More detailed examples of how the GDDPM 1 may be used to improve positioning system modules configured to estimate the position of a device are provided below.

Figure 8:
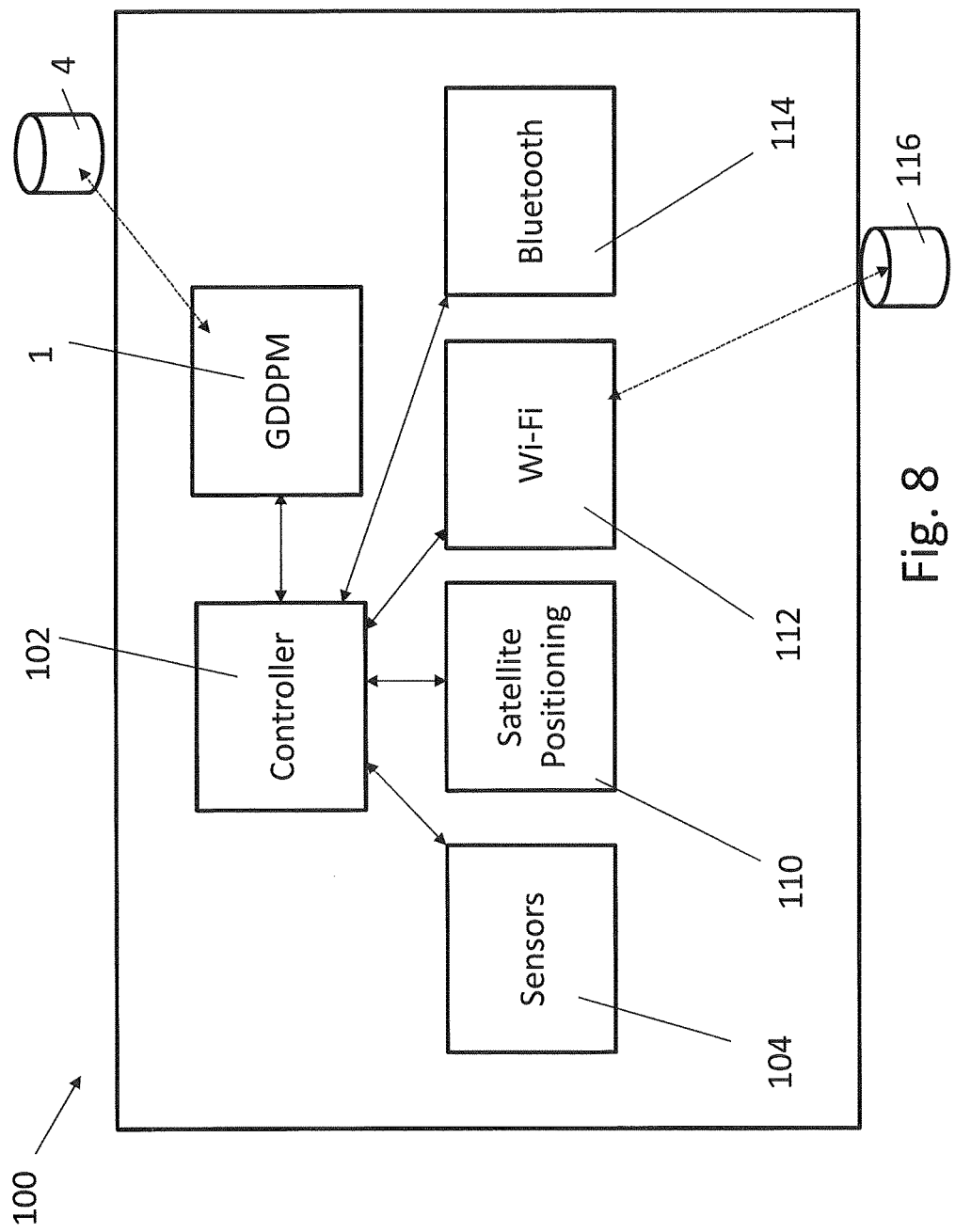
FIG. 8 is a block diagram illustrating the features of a personal mobile electronic device in communication with a database.

In each of the examples below, it will be assumed that the position of the device is determined by a personal mobile device 100 in communication with the database 4. The device 100 may be a mobile smart phone, tablet computer, personal data assistant (PDA), laptop, satellite positioning device or the like, illustrated in FIG. 8. However, it will be understood that any suitable position locating device comprising a suitable positioning system module may be used.

The personal mobile device 100 may be used to determine its own position, or the position of another device, such as an electromagnetic signal source within an indoor region.

Personal mobile device 100 comprises a controller 102 in electronic communication with a plurality of positioning system modules including a sensors module 104, a satellite positioning system module 110, a Wi-Fi module 112 and a Bluetooth module 114. The sensors module 104 comprises a plurality of sensors internal to the personal electronic device from which positioning information can be derived, such as an accelerometer, compass, and optionally a gyroscope and a barometer. The Satellite positioning system module 110, Wi-Fi module 112 and Bluetooth module 114 comprise satellite positioning system, Wi-Fi and Bluetooth receivers respectively. It will be understood that the controller 102 forms part of each of the positioning system modules 104-114. Also in electronic communication with the controller 102 is the GDDPM 1 in communication with the database 4.

Example 1: Positioning Using Electromagnetic Signal Sources

Figure 9:
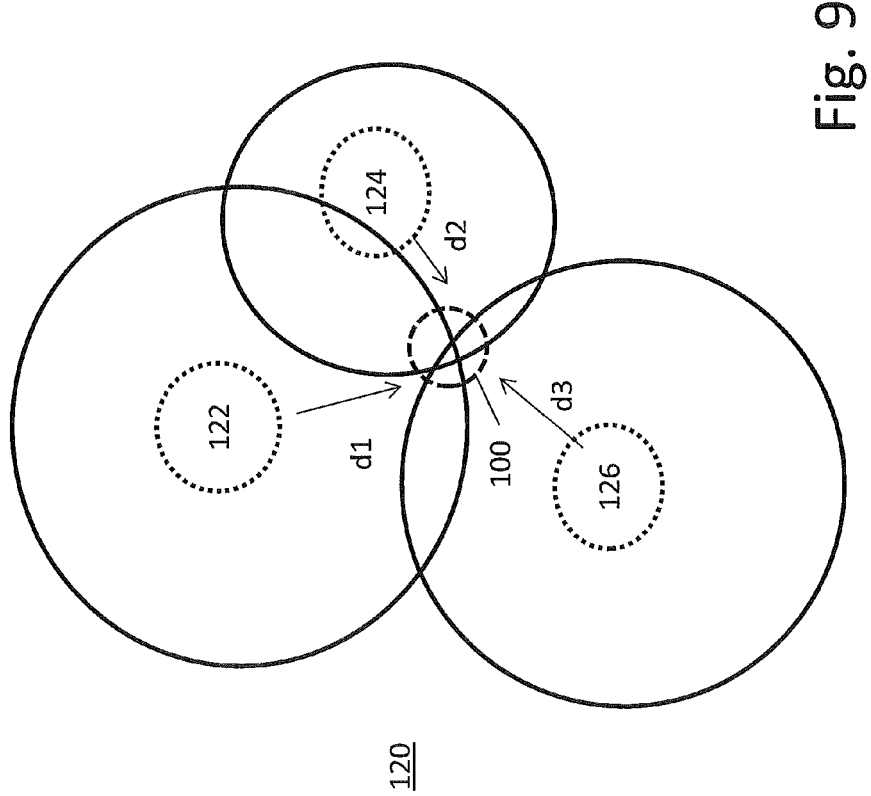
FIG. 9 illustrates the process of triangulation.

FIG. 9 shows the device 100 located in an indoor region 120 comprising three electromagnetic signal sources 122, 124, 126. Although the electromagnetic signal sources may be Wi-Fi Access Points, Bluetooth Access Points or any other suitable electromagnetic signal source (e.g. near field communication access point), it will be assumed below that the electromagnetic signal sources are Wi-Fi Access Points (WAPs).

Electromagnetic signals transmitted by the WAPs 122, 124, 126 typically comprise identifiers (such as their MAC addresses), transmitted signal powers, types and model. The WAPs 122, 124, 126 may also transmit their locations. Accordingly the transmitted signal powers and locations of the WAPs 122, 124, 126 can be determined by the Wi-Fi positioning system module 112 by processing detected signals from the WAPs 122, 124, 126. Alternatively, their locations and transmitted powers may be determined by the Wi-Fi positioning system module 112 requesting their locations from the source characteristics database 116. The received signal strength (RSSI) from each electromagnetic signal source 122, 124, 126 can also be measured by the device 100.

The device 100 may calculate its distance from each of the detected WAPs by using the following formula with respect to each source:

$$P_r = \frac{P_t G_t G_r \lambda^2}{(4\pi)^2 d^2} \quad (1)$$

where $P_r$ is the received signal power at the device 100, $P_t$ is the transmitted power of the source, $G_r$ and $G_t$ are the receiver and transmitter gains respectively, $\lambda$ is the signal wavelength and d is a distance between source and receiver.

This function may alternatively be expressed in terms of propagation gain (PG) as:

$$PG = \frac{P_r}{P_t G_t G_r} = \frac{\lambda^2}{(4\pi)^2 d^2} \quad (2)$$

and in decibels form as:

$$PG_{dB} = 20 \log(\lambda/4\pi d) \quad (3)$$

Typically, all of the parameters of the above equations, apart from distance, d, are known to the device 100. Accordingly, the device 100 may determine its distance, d, from a given source 122, 124, 126 using the above equation.

The above equation is useful for a free space environment, but may not be sufficiently accurate for use in "real world" indoor environments such as tunnels or shopping centres. An alternative equation for use in such indoor environments may be:

$$PG_{dB} = 20 \log(\lambda/4\pi d_0) + 10n \log(d/d_0) + X_\sigma \quad (4)$$

where X, n and $d_0$ are parameters which vary with different indoor environments and which can be determined empirically.

Appropriate values of X, n and $d_0$ specific to the indoor region 120 (or specific to the subregions of indoor region 120 between the device 100 and a particular WAP 122, 124, 126) may be requested by the Wi-Fi positioning system module 112 from the propagation characteristics 8 of the database 4 to determine the distance, d, of the device 100 from each WAP 122, 124, 126. Additionally or alternatively, the appropriate equation for use in determining the distance, d, may be requested by the Wi-Fi positioning system module 112 from the propagation characteristics 8 of the GDDPM 1. Alternatively, a reference indicator from which the appropriate equation can be derived may be requested from the propagation characteristics 8 of the GDDPM 1. In this case, for example, equations (3) and (4) may be stored in a memory of the Wi-Fi positioning system module 112, and the GDDPM 1 may provide a reference indicator to an appropriate one of the equations for use with respect to an indoor region, or a particular subregion of the indoor region.

The Wi-Fi positioning system module 112 may then use the appropriate equation and appropriate parameters to estimate the distances, d, of the device 100 from each WAP 122, 124, 126.

When the distances of the device 100 from three different WAPs have been determined, the position of the device can be estimated using triangulation by the Wi-Fi positioning system module 102, 112. For example, a circle having a radius, d, can be drawn around each of the three electromagnetic signal sources, and the position of the device 100 can initially be estimated to be the point at which the three circles intersect (or the point closest to an intersection between the three circles if no intersection points can be identified).

Optionally, as described above, weightings may be associated with the signals received from one or more electromagnetic signal sources (or data derived therefrom) to estimate the position of the device as described above. For example, weightings may be applied when more than three electromagnetic signal sources are detectable by the device, and the weightings may be used to select the signals transmitted by the sources having the highest weightings from which a provisional estimated position of the device 100 can be determined.

After a provisional estimated position of the device 100 has been estimated by the above method, it may be sent to the GDDPM 1 where it is compared to constraints and/or path data provided by the GDDPM 1. If the provisional estimated position of the device 100 does not comply with the constraints (e.g. relationship rules, topological features) and/or the provisional estimated position does not lie on a path provided by the GDDPM 1, the provisional estimated position of the device 100 may be adjusted to comply with the constraints and/or such that it lies on a path provided by the GDDPM 1.

Thus, in this example, the GDDPM 1 may both provide location specific geographical descriptive data for use by a positioning system module to determine a provisional estimated position of the device 100 and adjust the provisional estimated position of the electromagnetic signal source using the location specific geographical descriptive data. By using location specific data in this way, the accuracy of the estimated position of the device 100 is improved.

It will be understood that it may be that the GDDPM 1 is used in only one of these steps—i.e. the provisional estimated position of the device 100 may be determined without using data from the database 4 or the provisional estimated position of the device 100 may be provided as the estimated position of the device 100 without adjusting it in accordance with the constraints provided by the GDDPM 1. In this case, an improvement in the accuracy of the estimated position of the device 100 is still typically obtained.

Example 2: Mapping Electromagnetic Signal Sources

In this example, the GDDPM 1 is used by the device 100 to determine the positions of electromagnetic signal sources within an indoor region.

First, the device 100 receives electromagnetic signals from an electromagnetic signal source at three different positions within the indoor region. The device 100 then determines its distance from the electromagnetic signal source at each of the three positions using electromagnetic signal source transmitted power data (e.g. obtained from a database of electromagnetic signal data or from the signals transmitted by the electromagnetic signal source if available) and electromagnetic signal propagation characteristics requested from and provided by the GDDPM 1 as described above. The Wi-Fi positioning module 112 of the device 100 can then determine a provisional estimated position of the electromagnetic signal source by triangulation. For example, circles of radius, d (the appropriate values of d being used in each case), can be drawn around each of the three positions of the device 100 and the position of the electromagnetic signal source can be taken as the point of intersection of the three circles. The location of the device 100 at each of the three positions may be determined by any available positioning system module 104-114 (which may or may not use geographical descriptive data requested from and provided by the GDDPM 1).

After the provisional estimated position of the electromagnetic signal source has been initially estimated by the Wi-Fi positioning module 112, it may be sent to the GDDPM 1 which compares it against constraints (e.g. relationship rules, topological features) and/or path data provided by the database of the GDDPM 1. If the provisional estimated position of the electromagnetic signal source does not comply with the constraints and/or the provisional estimated position does not lie on a path provided by the GDDPM 1, the estimated position of the electromagnetic signal source may be adjusted to comply with the constraints and/or such that it lies on a path provided by the GDDPM 1.

Thus, in this example, the GDDPM 1 may both provide location specific geographical descriptive data for use by a positioning system module to determine a provisional estimated position of the electromagnetic signal source and adjust the provisional estimated position of the electromagnetic signal source using the location specific geographical descriptive data. By using location specific data in this way, the accuracy of the estimated position of the electromagnetic signal source is improved.

Again, it will be understood that the GDDPM 1 may be used in only one of these steps—i.e. the provisional estimated position of the electromagnetic signal source may be determined without using data from the database 4 or the provisional estimated position of the electromagnetic signal source may be provided as the estimated position of the electromagnetic signal source without comparing it to constraints provided by the GDDPM 1. In this case, an improvement in the accuracy of the estimated position of the electromagnetic signal source is still obtained.

In an alternative example, a plurality of devices 100 may receive electromagnetic signals transmitted from an electromagnetic signal source. The devices 100 are adapted to transmit the received electromagnetic signals (or data derived therefrom) to a server computer which (typically temporarily) stores the electromagnetic signals (or data derived therefrom). The GDDPM 1 of each device 100 may obtain characteristics requested from the database 4 as described above, and the said characteristics may be provided to the server together with the electromagnetic signals (or data derived therefrom) received by each device 100 (and typically together with electromagnetic signal source transmitted power data (e.g. obtained from a database of electromagnetic signal data or from the signals transmitted by the electromagnetic signal source if available)). The server may then process the electromagnetic signals (or data derived therefrom) provided by each device 100, together with the respective characteristics provided by that device 100 and electromagnetic signal source power data, to estimate (or update) the position of the electromagnetic signal source. As explained above, this may require estimates of the positions of the devices 100 to be sent to the server together with the electromagnetic signals (or data derived therefrom) and the characteristics obtained from the GDDPM 1 (and typically electromagnetic signal power data) in each case. The positions of the devices 100 may be obtained using any of the positioning system modules 104-114 which are available (and optionally which meet one or more accuracy criteria) to the respective devices when they received the electromagnetic signals.

By estimating the position of the device based on signals received by a plurality of receiving devices, the position of the device may be more accurately estimated.

It will be understood that the server may only require signals received by one or more devices 100 at a total of three different locations to execute a triangulation algorithm for estimating the position of the device. If more data than is required is received by the server, the server may apply one or more selection criteria in order to select the data which will result in the most accurate position estimate. For example, the server may select the data related to the strongest received electromagnetic signals. In an alternative example, the server may select data from locations which are furthest apart.

Example 3: Positioning Using Sensors

For the purposes of the discussion below, it will be assumed that the sensors module 104 comprises an accelerometer configured to measure a vertical acceleration of the device and a compass (and optionally a gyroscope) for measuring an orientation of the device.

FIG. 10A is a plot of vertical acceleration data versus time as measured by the accelerometer when a user walks or runs carrying the device 1. The plot shown in FIG. 10A has eight local maxima 130-144 and eight local minima 146-160. Each transition between a local maximum 130-144 and a chronologically subsequent and adjacent local minimum 146-160 is caused by a step taken by the user. Accordingly, the accelerometer can be used as a pedometer, where steps taken by the user can be detected by processing the vertical acceleration data to extract the local maxima and minima. However as shown in FIG. 10A, the raw vertical acceleration data measured by the accelerometer also comprises fluctuations in vertical acceleration which are not caused by steps taken by the user. In order to remove these fluctuations, the vertical acceleration data may low pass filtered. The low pass filtered vertical acceleration data is shown by the heavier line in FIG. 10B. It can be seen from FIG. 10B that the local maxima 130-144 and local minima 146-160 are more clearly defined following low pass filtering. This in turn makes the local maxima and minima, and therefore steps taken by the user, easier to extract from the vertical acceleration data.

Note that the vertical acceleration data shown on FIGS. 10A and 10B fluctuates around 9.81 ms$^{-2}$ due to the effect of gravity.

Figures 11A, 11B:
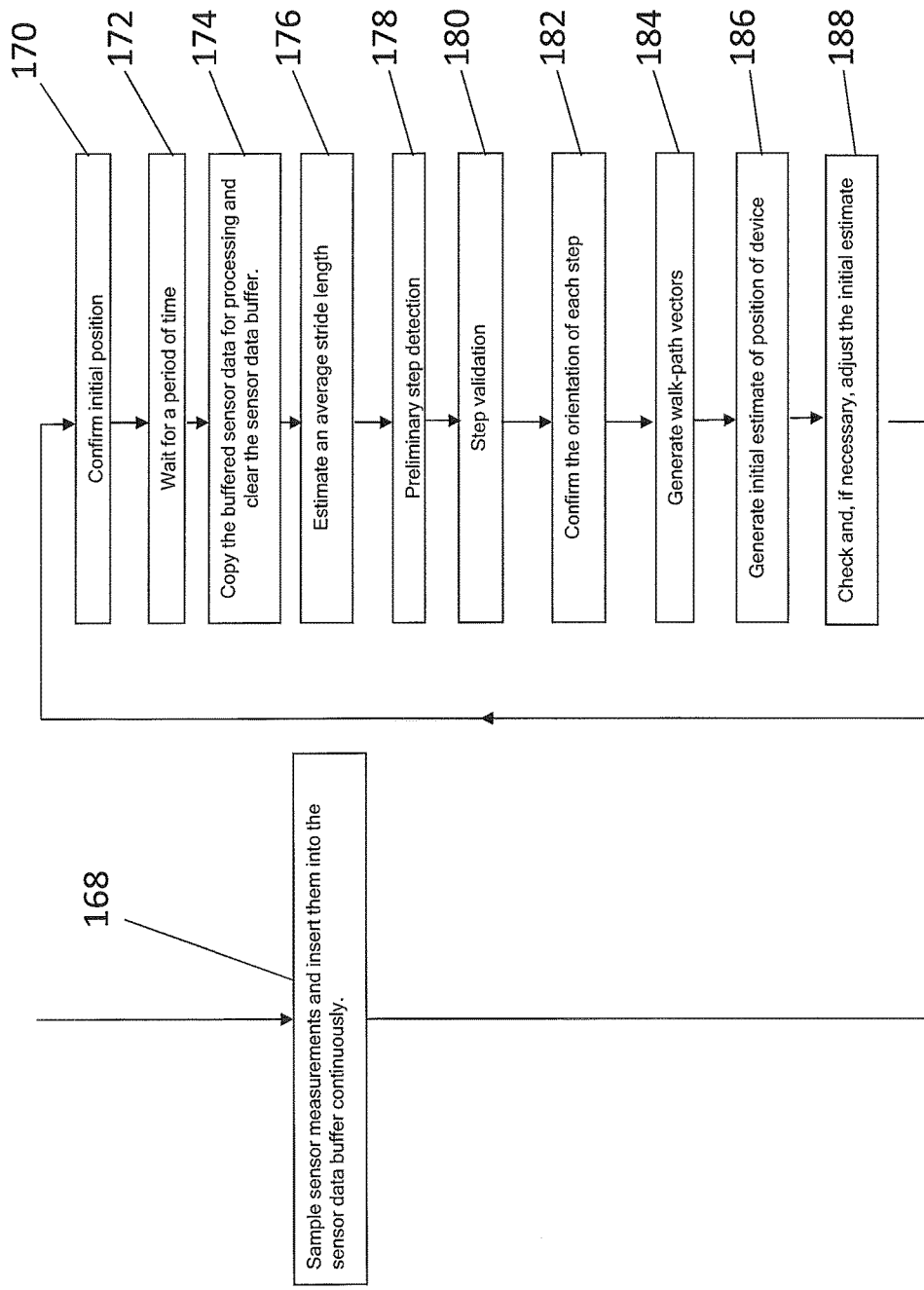
FIGS. 11A and 11B illustrate a positioning algorithm using data generated by the sensors module of the device of FIG. 8.

FIGS. 11A and 11B are flow charts illustrating a method of estimating the position of the device 100 which may be executed by the controller 102 using the vertical acceleration data measured by the accelerometer and directional data measured by the compass (and optionally the gyroscope). The processes of FIGS. 11A and 11B are performed in parallel.

FIG. 11A consists of the single step 168 of continuously sampling data measurements from the accelerometer and the compass and typically the gyroscope and buffering the raw measurement data in a buffering section of a memory of the sensors module 104. Each vertical acceleration measurement made by the accelerometer and each directional measurement made by the compass and typically data measured by the gyroscope are chronologically indexed by the controller 102. It will be understood that the chronological index may be a relative or absolute time stamp, or simply an indicator of a chronological order in which the data is measured.

In a first step 170 of FIG. 11B, an initial position of the device 100 is provided. This initial position may be determined by any of the positioning system modules 104-114.

In a second step 172, the controller 102 waits for a predetermined time period, during which the buffer section of the memory of the sensors module 104 is populated with raw measurement data buffered from the accelerometer, the compass (and typically the gyroscope). The predetermined time period may be set; alternatively predetermined time period may be customisable by a user of the device 100.

In a third step 174, the controller 102 copies the buffered sensor data to a processing section of the memory of the sensors module 104 for processing, and clears the buffer section of the memory so that the buffer section can store new sensor data received by the accelerometer, compass and gyroscope.

In a next step 176, an average stride length of the user over the predetermined time period is estimated by the controller 102. In order to estimate the average stride length of the user, the following formula may be used:

$$\text{Stride\_length} = ((A_{max} - A_{min})/(A_{avg} - A_{min})) * C$$

where: $A_{max}$ is the average (typically mean) magnitude of the greatest 10% by magnitude of the vertical acceleration measurements;

$A_{min}$ is the average (typically mean) magnitude of the lowest 10% by magnitude of the vertical acceleration measurements;

$A_{avg}$ is the average (typically mean) magnitude of all of the vertical acceleration measurements; and C is a fixed co-efficient which may be determined empirically. Typically, a value of 0.25 is suitable, and provides most accurate results for an actual stride length of between 500 mm and 600 mm.

This formula provides an effective trade-off between accuracy and efficient power consumption by the controller 102.

At a next step 178, preliminary step detection is performed. In order to detect one or more steps taken by the user carrying the device 100, firstly, as described above, the controller 102 low pass filters the vertical acceleration data to remove fluctuations in vertical acceleration data not caused by steps taken by the user. Next, the controller 102 identifies the local maxima and local minima of the filtered vertical acceleration data and stores their magnitudes and chronological indices in memory. For the purposes of the following discussion it will be assumed that the filtered acceleration data is identical to the example shown in FIG. 10B and thus has eight local maxima 130-144 and eight local minima 146-160. In order to determine whether a step may have been taken by the user, the controller 102 compares each local maximum with a chronologically adjacent and subsequent local minimum.

Firstly, the magnitude of each local maximum is compared with the magnitude of the chronologically adjacent and subsequent local minimum to determine a magnitude difference value. For example with reference to FIG. 10B, the magnitude of local maximum 130 is approximately 17 ms$^{-2}$ while the magnitude of the chronologically adjacent and subsequent local minimum 146 is approximately 4.5 ms$^{-2}$. Accordingly the magnitude difference value is 13.5 ms$^{-2}$.

Secondly, the chronological index (in the example shown in FIGS. 10A and 10B, the chronological index is a relative time stamp) of each local maximum is compared with the chronological index of the chronologically subsequent local minimum to determine a chronological difference value. In the example referred to above the chronological index associated with the local maximum 130 is approximately 2.1 seconds while the chronological index associated with local minimum 146 is approximately 2.4 seconds. Accordingly the chronological difference between the local maximum 130 and local minimum 146 is approximately 300 ms. This chronological index is stored in memory.

Next, a relationship table, such as the following, may be used to estimate whether or not a step has been taken by the user:

| D = \|max\| − \|min\| | T = time$_{trough}$ − time$_{peak}$ | Detection? |
| --- | --- | --- |
| D > 4.5 | T < 500 ms | yes |
| 3 < D < 4.5 | 97 ms < T < 500 ms | yes |
| D < 3 | | no | where D is the magnitude difference value and T is the chronological difference value.

Thus when D is greater than a magnitude threshold value, in this case 4.5 ms$^{-2}$, and T is less than a chronological reference value, in this case 500 ms, a step is detected from the local maximum and the local minimum. If either of these conditions is not met, the second test described on the second line of the relationship table is performed. That is if D is between first and second magnitude threshold values 3 ms$^{-2}$ and 4.5 ms$^{-2}$, and T is between first and second chronological reference values 97 ms and 500 ms, a step is detected from the local maximum and the local minimum. If neither of these conditions is met, no step is detected from that local maximum and local minimum combination. It will be understood that other (more or less) complex tests may be performed in the preliminary step detection process 178.

It will be understood that, in some embodiments, only the magnitude, or chronological index of chronologically adjacent local maxima and minima may be compared to determine whether a step may have been taken by the user. However, preferably both the magnitudes and chronological indices are compared.

The chronological index associated with each detected step is the chronological index of the local minimum associated with that step. Therefore the step associated with local maximum 130 and local minimum 146 is considered to have been taken at a chronological index of approximately 2.4 seconds.

In the next step 180, a step validation process is performed. Firstly, the magnitude of the local minimum associated with each detected step is compared with the magnitude of the chronologically subsequent and adjacent local maximum to determine a validation magnitude difference value. Additionally or alternatively, the chronological index of the local minimum associated with each detected step is compared with the chronological index of the chronologically subsequent and adjacent local maximum to determine a validation chronological difference value. If the validation magnitude difference value is greater than a validation magnitude threshold value, and the validation chronological difference value is less than the validation chronological difference threshold value, the step associated with that local minimum is validated. Conversely, if the validation magnitude difference value is less than the validation magnitude threshold value, and/or the validation chronological difference value is greater than the validation chronological difference threshold value, the step associated with that local minimum is invalidated.

In an exemplary embodiment, the validation magnitude threshold value may be 2.5 ms$^{-2}$, while the validation chronological difference threshold value may be 900 ms. For the step associated with local maximum 130 and minimum 146, the validation magnitude difference value is approximately 16.5 ms$^{-2}$ while the validation chronological difference value is approximately 400 ms. The validation magnitude difference value is thus greater than the validation magnitude threshold value and the validation chronological difference value is less than the chronological difference threshold value. Accordingly, the step associated with local maximum 130 and minimum 146 is validated.

By comparing the local minimum from which a step has been detected to a chronologically subsequent local maximum which was not used to detect that step, further context is taken into account regarding the movements of the user which helps to validate or invalidate the detection of the one or more steps.

As an additional or alternative validation measure, a search for anomalies of step interval may be performed. In this case, chronological index intervals between chronologically adjacent detected steps may be determined. In practice, this typically involves calculating the difference in chronological index between the local minima associated with adjacent detected steps. In addition, a normalised chronological index interval may be determined by averaging all of the determined chronological index intervals. For example, the normalised chronological index interval may be the mean of all the determined chronological index intervals. Then, for each detected step, the controller 102 may determine whether a difference between the normalised chronological index interval and the chronological index interval between that step and a preceding detected step is within a predetermined range of the normalised chronological index interval. Additionally or alternatively, it may be determined whether the difference between the normalised chronological index interval and the chronological index interval between that step and a subsequent detected step is within a predetermined range of the normalised chronological index interval. If both of these intervals are within the predetermined ranges of the normalised chronological index interval, the detected step is validated. If either or both of these intervals are not within the respective predetermined ranges of the normalised chronological index interval, this step is invalidated.

By comparing the chronological index interval between chronologically adjacent steps with a normalised chronological index interval, outlier intervals can readily be identified and the steps associated with the outlier intervals can thus be invalidated before any motion vectors are generated (see below). This helps to improve the accuracy of the estimation of the updated position of the device 100.

In the next step 182, the controller 102 determines the orientation of the device during each validated detected step. In order to determine the orientation of the device during a given step, directional measurements made by the compass between the local maximum and local minimum associated with that step may be averaged (e.g. by taking the mean direction of the compass readings). If the compass reading of a validated detected step varies from the orientation of a preceding validated detected step by more than a predetermined threshold, measurements made by the gyroscope between the two steps may be used to validate or invalidate the compass reading. For example, this may be done by integrating the gyroscope measurements taken between the local maximum and minimum associated with that step on a horizontal plane. If the compass reading is validated by the gyroscope measurements, the average compass direction will be validated as the direction of the step. If the compass reading is invalidated by the gyroscope measurements, the direction of the step will be taken to be the orientation of the device during the preceding validated detected step.

Following detection and validation of the steps taken by the user, determination of the average stride length of the user, and the determination of the orientation of the device from the compass/gyroscope measurements, a walk-path motion vector is generated in step 184 for each validated detected step. Each step is considered to have followed a distance equal to the average stride length in the direction derived from the orientation of the device as described above. A plurality of the walk-path motion vectors may be subsequently combined if, for example, they indicate movement in the same direction. Once generated, the motion vectors are stored in a vector buffer of memory.

A provisional estimated position of the device 100 can then be determined in step 186 by combining the motion vectors with the initial position of the device 100 to provide a provisional estimated position of the device. The provisional estimated position may then be sent to the GDDPM 1 where it is compared to constraints and/or path data provided by the GDDPM 1 in a further step 188. If the provisional estimated position of the device 100 does not comply with the constraints (e.g. relationship rules, topological features) and/or the provisional estimated position does not lie on a path provided by the GDDPM 1, the provisional estimated position of the device 100 may also be adjusted in step 188 by the GDDPM 1 to comply with the constraints and/or such that it lies on a path provided by the GDDPM 1, thereby improving the accuracy of the estimated position of the device 100.

The algorithm may then return to step 170 to determine a subsequent position estimate.

Because the accelerometer, compass and gyroscope are provided internally to the device 100, the device 100 does not need to communicate with any external devices (e.g. satellites, wireless access points) or have access to a data communications network or a server in order to estimate its position. Accordingly, particularly but not exclusively, the method for estimating the position of the device 100 illustrated in FIGS. 11A and 11B may be used when other positioning system modules 110-114 are unavailable (e.g. when no line of sight is present between the device and satellites for satellite positioning, or when no known electromagnetic signal sources are in range of the device or no access to a server via a data communications network is available) or the other position estimation technologies are not available to provide a greater accuracy than the method illustrated in FIGS. 11A and 11B.

The accelerometer may be a 1 or 2-axis accelerometer arranged to detect vertical acceleration. Alternatively, the accelerometer may be a 3-axis accelerometer configured to detect vertical acceleration.

Example 4: Positioning Using a Satellite Positioning System

Although it is typically used to improve the accuracy of other positioning system modules, the GDDPM 1 may be used to improve the accuracy of satellite positioning systems such as the Global Positioning System (GPS). For example, a provisional estimated position of a device may be obtained by processing satellite positioning systems received by the satellite positioning receiver of the device 100 with the controller 102. The provisional estimated position of the device 100 may then be sent to the GDDPM 1 where it is compared to constraints and/or path data provided by the GDDPM 1. If the provisional estimated position of the device 100 does not comply with the constraints (e.g. relationship rules, topological features) and/or the provisional estimated position does not lie on a path provided by the GDDPM 1, the provisional estimated position of the device 100 may be adjusted to comply with the constraints and/or such that it lies on a path provided by the GDDPM 1, thereby improving the estimated position of the device 100.

It will be understood that, in order to improve accuracy further, combinations of positioning system modules may be employed at any given time. For example, both satellite positioning and Wi-Fi based positioning algorithms (based on processing electromagnetic signals transmitted by Wi-Fi access points of known position) may be used in combination with each other to improve the accuracy of the position estimates. In this case, the combination of positioning system modules may also be used in combination with the GDDPM 1 to improve the accuracy of the estimate of the position of the device.

Example 5: Feature Detection

As explained above, the database 4 of the GDDPM 1 may store one or more reference patterns 16 which may be provided to a positioning system module, such as the sensors module 104, satellite positioning module 110, Wi-Fi module 112 or the Bluetooth module 114 to detect one or more topological features in the indoor region. The positioning system module may need to be adapted to send estimated positions of the device 100 to the GDDPM 1, to receive reference movement patterns from the GDDPM 1 and to perform one or more pattern recognition algorithms. The positioning system module may also be adapted such that execution of the one or more pattern recognition algorithms is activated by a signal received from the GDDPM 1, alerting the positioning system module to the fact that the device has entered a predefined zone associated with a topological feature and that at least one relevant reference pattern is available. The positioning system module may be further adapted to deactivate execution of a pattern recognition algorithm in response to a signal provided by the GDDPM 1 alerting the positioning system module that the device is outside of a respective predefined zone.

Figure 12:
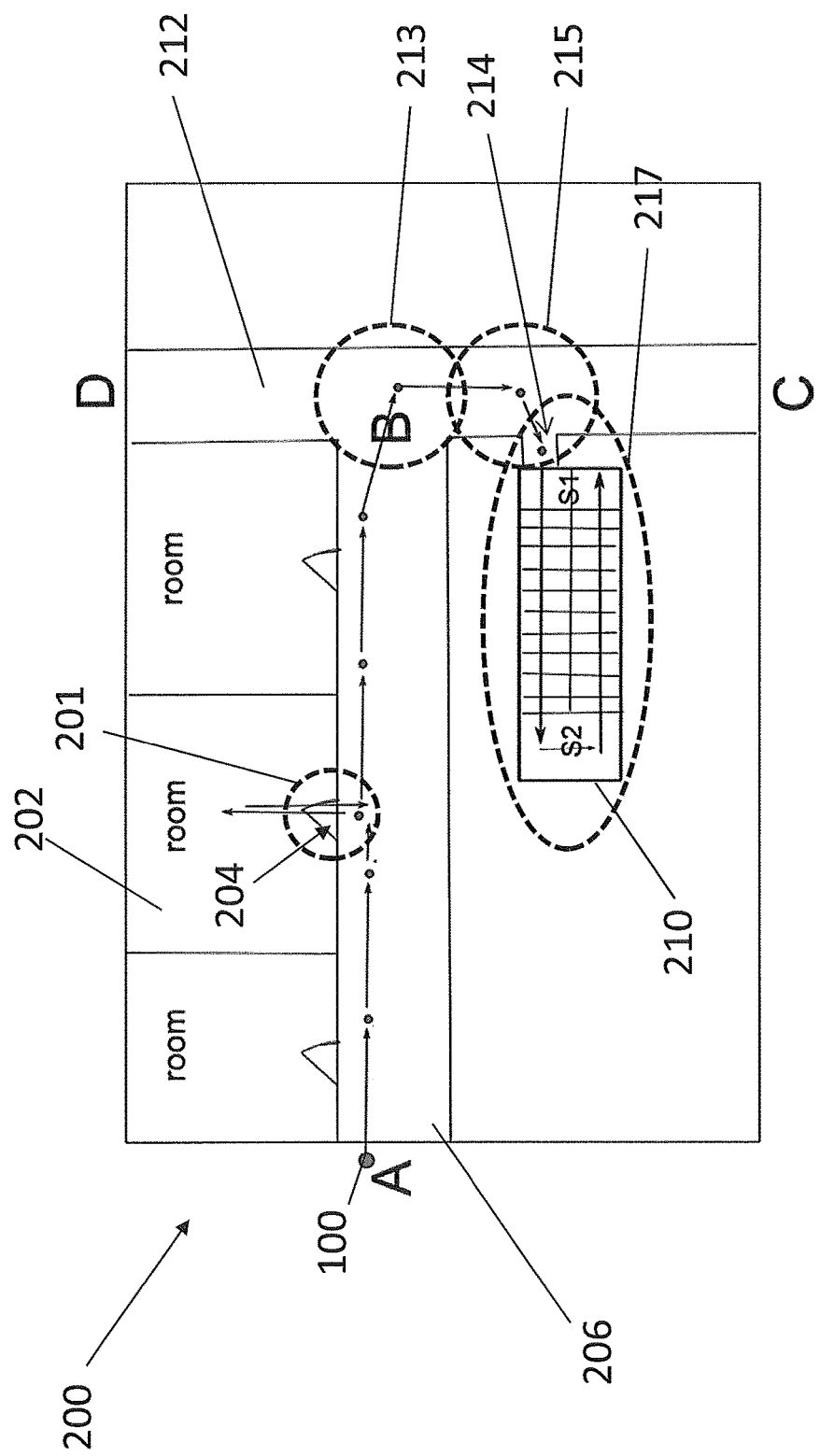
FIG. 12 illustrates a method of using location specific data to correct an estimated location of the device using pattern recognition.

For example, as shown in FIG. 12, for the device 100 to enter a particular subregion (e.g. room) 202 of an indoor region 200, the device 100 may need to be carried through a doorway 204 from a corridor 206. In order to turn from the corridor 206 into the doorway 204, the device 100 is required to turn through approximately 90°. When the device 100 enters a predefined zone 201 of the doorway 204, and when an estimated position of the device 100 within the predefined zone 201 is provided to the GDDPM 1, the GDDPM 1 alerts the positioning system module to the fact that the device has entered the predefined zone 201 and that a reference movement pattern is available. This activates the positioning system module to perform a feature (doorway) detection algorithm.

As part of the pattern recognition algorithm, the positioning system module may request the reference movement pattern from the GDDPM 1, which duly provides the turning point reference movement pattern to the positioning system module. The positioning system module then compares relative movements of the device 100 with the reference movement pattern provided by the GDDPM 1. If the relative movements of the device 100 conform to the reference movement pattern, an estimated position of the device 100 can be adjusted to improve its accuracy. More specifically, if it is determined that the device 100 has made a 90° turn within the predefined zone 201 of the doorway 204 from the corridor 206, it may be determined by the controller 102 that the device 100 has entered the subregion 202 through the doorway 204, and an estimated position of the device 100 can be adjusted to match the position of the doorway 204, or to a position adjacent to the doorway. Typically, the estimated position of the device 100 may be "snapped" to path data 12 provided by the GDDPM 1 within the predefined zone 201. Since the position of the doorway 204 is accurately defined in the layout information 10 of the GDDPM 1 (typically more accurately than the estimated accuracy of the above positioning systems), the accuracy of the estimated position of the device 100 can thus be improved.

As indicated above, the predefined zone 201 is defined by the data provided by the GDDPM 1. The predefined zone 201 may simply be a zone of a particular radius surrounding the doorway 204. Alternatively zones having more complex shapes may be defined.

Typically, a plurality of predefined zones 201, 213, 215, 217 are defined in the topological information provided by the database 4, one zone being provided around, and associated with, a respective topological feature. In the exemplary embodiment, zone 213 is provided around (and associated with) a first turning point between one end of the corridor 206 and a second corridor 212 (which extends perpendicularly to the corridor 206); zone 215 is provided around (and associated with) a second turning point between the end of the second corridor 212 and a third corridor 214 (which extends perpendicularly to the second corridor); and zone 217 is provided around (and associated with) a staircase which is identical to the staircase 210. The predefined zones 201, 213, 215, 217 may be of different sizes and/or different shapes, the size and/or shape of each predefined zone being particular to the topological feature around which it is provided. For example, the predefined zone 217 provided around the staircase 210 is larger and more elongate than the zones 213, 215 provided around the corridor turning points and the zone 201 provided around the doorway 204. This is because the staircase 210 is physically larger than the turning points and the doorway 204, and because the staircase is more elongate than the turning points and the doorway 204.

A similar turning point detection algorithm can be employed to detect the turning point between the end of the corridor 206 and the second corridor 212. In this case, when the device enters the predefined zone 213 provided around (and associated with) the turning point, the processor 2 of the GDDPM 1 sends a signal to a positioning system module to alert it to the fact that the device 100 has entered the predefined zone 213 and that a reference movement pattern is available. This activates the positioning system module to perform the turning point detection algorithm. As part of the turning point detection algorithm, the positioning system module first requests the reference movement pattern from the GDDPM 1, which duly provides the turning point reference movement pattern to the positioning system module. The positioning system module then compares relative movements of the device 100 with the reference movement pattern provided by the GDDPM 1. If the relative movements of the device 100 conform to the reference movement pattern, an estimated position of the device 100 can be adjusted to a position at or adjacent to the end of the corridor 205 to improve its accuracy. Preferably, the position of the device is "snapped" to a position lying on a path (provided by path data 12) passing through or adjacent to the turning point.

As above, another similar turning point algorithm can be employed to detect the turning point between the corridors 212 and 214. Again, execution of this turning point detection algorithm is activated by the GDDPM 1 when the device enters the predefined zone 215 provided around (and associated with) the said turning point between the corridors 212 and 214. The turning point algorithm in this case uses a reference pattern representative of movements expected to be taken by the device when it follows the turning point between corridors 212, 214.

As described above, an alternative reference movement pattern (illustrated in FIGS. 7A-7C) may be used to determine that the device 100 has ascended or descended the staircase 210 (shown schematically in FIG. 12). As above, when the device enters the predefined zone 217 provided around (and associated with) the staircase 210, the processor 2 of the GDDPM 1 sends a signal to a positioning system module to alert it to the fact that the device 100 has entered the predefined zone 217 and that a reference movement pattern is available. This activates the positioning system module to perform a floor-change detection algorithm. As part of the floor-change detection algorithm, the positioning system module first requests the staircase reference movement pattern from the GDDPM 1, which duly provides the staircase reference movement pattern to the positioning system module. The positioning system module then compares relative movements of the device 100 with the reference movement pattern provided by the GDDPM 1. If the relative movements of the device 100 conform to the staircase reference movement pattern, an estimated position of the device 100 can be adjusted to a position on or adjacent to the staircase to improve its accuracy. Preferably, the position of the device is "snapped" to a position lying on a path (provided in path data 12) passing through or adjacent to the staircase (e.g. at the top or bottom of the staircase). It will be understood that two reference patterns may be provided to the positioning system module when it enters the predefined zone 217, one for ascending the staircase and one for descending the staircase. It may thus be determined whether the device is ascending or descending the staircase from which reference movement pattern most closely matches the movement of the device.

It will be understood that there may be a delay between the device actually passing through or interacting with a particular topological feature and a determination that the device has passed through or interacted with that topological feature. Accordingly, the GDDPM 1 may be configured to retrospectively determine that the device has passed through or interacted with a particular topological feature, and to adjust one or more previously estimated positions of the device to a position at or adjacent to the topological feature (as above).

The GDDPM 1 may be configured to estimate a current position of the device by estimating a movement of the device during the said delay and combining said estimated movement with the adjusted previously estimated position(s). The GDDPM may be configured to estimate said delay by comparing chronological indices (e.g. time stamps) associated with the (e.g. satellite positioning or Wi-Fi) signals from which positions of the device are determined. The GDDPM may be configured to estimate movement of the device during the delay by translating subsequently estimated positions (i.e. positions estimated after the device had passed through or interacted with the topological feature) of the device in accordance with the adjustments applied to the said previously estimated position(s). Alternatively, the GDDPM may be configured to estimate the movement of the device during the delay by determining or obtaining a (e.g. average) speed and/or direction of movement of the device during said delay and generating a motion vector from the estimated speed and direction of movement of the device during, and the duration of, the delay. Additionally or alternatively, the GDDPM may be configured to estimate movement of the device during the delay by processing data generated by one or more sensors (e.g. accelerometer, compass) internal to the device during the delay, to generate one or more motion vectors, or obtaining the said motion vectors from the sensors module 104 comprising the said sensors. The GDDPM may be configured to combine movement of the device (e.g. motion vectors) during the delay with the adjusted previously estimated position(s) to estimate the current position of the device. It will be understood that some or all of the above steps may, where appropriate, be performed by the respective positioning system modules.

In order to further validate the determination that the device 100 has ascended or descended a staircase 210, one or more vertical indicators may be derived by the positioning system module 104. For example, a barometer may be provided on the device 100 (as part of the sensors positioning module 104), where changes of pressure provide a vertical indicator that the device 100 has moved vertically upwards or vertically downwards. Alternatively, vertical acceleration data generated by, for example, an accelerometer provided in the sensors module 104 may be processed to determine one or more vertical indicators. For example, it has been empirically determined that, if all of the following three conditions are met, the device has moved vertically upwards:

$$A_{ave\_max} - A_{ave\_min} > 10$$

$$A_{ave\_min} > 4.2$$

$$A_{ave\_max} < 16.2$$

where: $A_{ave\_max}$ is the average magnitude of the local maxima detected in step 168 described above with reference to FIG. 10B; and $A_{ave\_min}$ is the average magnitude of the local minima detected in step 168 described above with reference to FIG. 10B.

In addition, it has been empirically determined that, if both of the following two conditions are met, the device has moved vertically downwards:

$$A_{ave\_min} < 4.2$$

$$A_{ave\_max} > 16.2$$

$A_{ave\_min}$ and $A_{ave\_max}$ may be averaged over a time period to determine a vertical motion indicator over that time period. In this case, the vertical motion indicators indicate whether vertically up or vertically down movement has been performed by the device 100 over the time period.

Such indicators typically provide binary assessments as to whether the user has moved upwards (e.g. climbed a set of stairs) or downwards (e.g. descended a set of stairs), but are not typically suitable for determining vertical position accurately.

Typically, the vertical indicators may be used to validate or invalidate a determination that a staircase has been ascended or descended.

In another example, a zone and corresponding reference movement pattern(s) may be defined and associated with a main entrance/exit of a building. In this case, execution of a pattern recognition algorithm may be activated by the GDDPM 1 when the device enters the said zone as above. However, in this case, when movement of the device matches the reference movement pattern, the processor 2 of the GDDPM 1 may be configured to activate/deactivate a positioning system module of the device 100. For example, in the case of an entrance to a building, the processor 2 may be configured to deactivate the satellite positioning module 110 if satellite positioning is not typically available within the building.

Correcting Position "jumps" Using GDDPM

Figure 13:
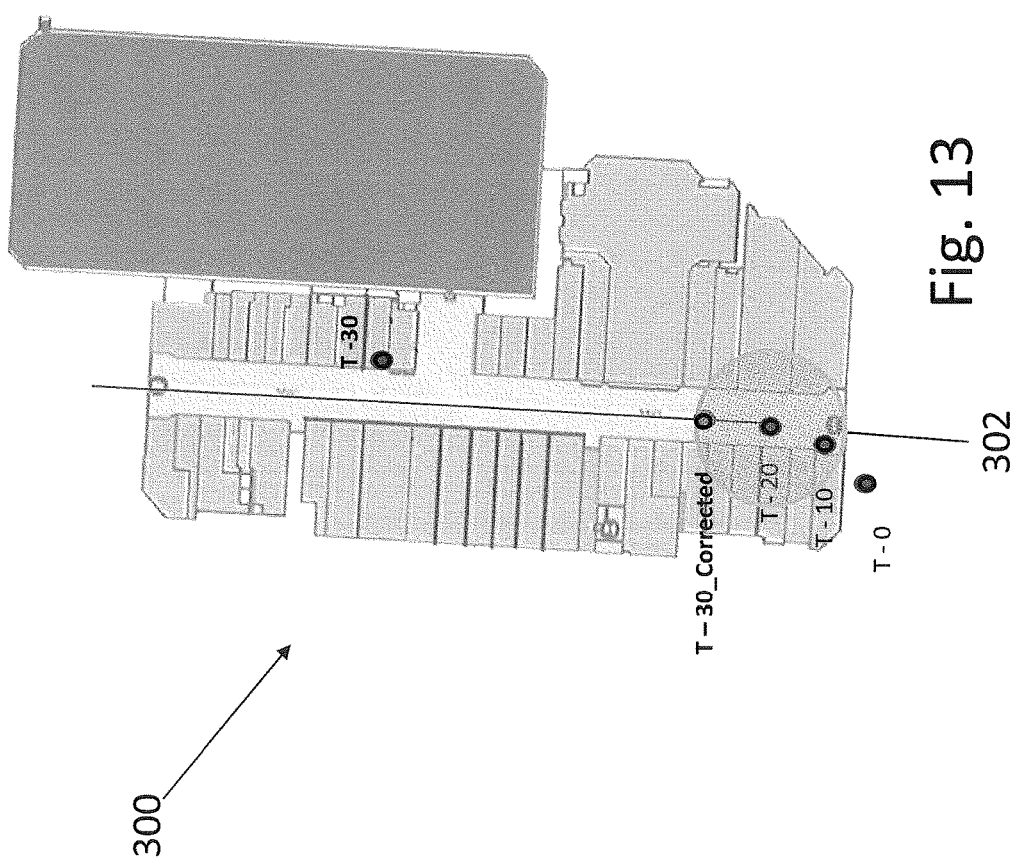
FIG. 13 illustrates another method of using location specific data to correct an estimated location of the device.

As illustrated in FIG. 13, the GDDPM 1 may be employed to predict one or (typically) more possible future positions of the device 100 within an indoor region 300 using the constraints and/or path data provided by the database 4 of the GDDPM. In the example of FIG. 13, the device 100 may be moved from outside the indoor region 300 into the indoor region following consecutive positions T-0, T-10 and T-20. At each position (in this case it will be assumed that the device 100 is currently at position T-20), the processor 2 of the GDDPM may measure an average (e.g. mean) speed of the device 100 (e.g. based on a plurality of previous position estimates of the device T-0, T-10, T-20 and chronological indices associated therewith) using estimated positions of the device (e.g. provided by one or more of the positioning system modules 104-114 and/or adjusted positions provided by the GDDPM 1). Alternatively, the average speed of the device 100 is provided by one or more of the positioning system modules. In either case, the average speed of the device is used by the GDDPM 1 to predict a range of possible future positions of the device 100, represented by the circle 302 in FIG. 13. The controller 102 then uses the constraints provided by the GDDPM 1 to refine the range of possible future positions. Typically, the controller 102 compares the range of possible future positions of the device 100 with the constraints and/or the paths provided by the GDDPM 1 and discards those possible future positions that do not comply with the constraints and/or those that do not lie on a path.

Next, one of the positioning system modules 104-114 available to the device 100 provides a provisional estimated position T-30 of the device 100 to the GDDPM 1. The processor 2 of the GDDPM 1 then compares the provisional estimated position T-30 with the refined range of predicted possible positions of the device 100. If the provisional estimated position T-30 of the device 100 does not lie in the refined range of predicted possible positions of the device 100, as is the case in the example of FIG. 13, the processor 2 of the GDDPM 1 adjusts the provisional position to lie within the refined range of predicted possible positions of the device 100 to provide a corrected position of the device 100, T-30_Corrected. To do this, the processor 2 may compare the provisional estimated position of the device 100 with the refined range of predicted possible positions of the device 100 and select the closest point T-30_Corrected within the refined range of predicted possible positions of the device. However, it will be understood that any other suitable method may be employed. For example, an alternative positioning system module 104-114 available to the device 100 may be enabled and, if the provisional estimated position predicted by the alternative positioning system of the device lies within the refined range of predicted possible positions of the device, that position may be selected as the corrected position T-30_Corrected.

The direction of travel of the device 100 may also be used to further refine the range of possible future positions of the device.

In another example, the possible future positions of the device may be refined by using the layout information 10 of the GDDPM 1. For example, from a position inside a building, the possible future positions of the device may not include a position on an opposite side of a wall adjacent to a current position of the device 100 if no doorways (or other portals through the wall) are available in the vicinity of the device. Accordingly, if a subsequent provisional estimated position lies on the other side of the wall from the current position of the device, the provisional estimated position may be adjusted to lie on the side of the wall on which the current position of the device lies.

It will be understood that any of the data provided by the GDDPM 1 may be used to refine the range of possible future positions of the device.

Further modifications and variations may be made within the scope of the invention herein disclosed.

The invention claimed is:

1. A method of estimating the position of a device, the method comprising:
   providing a database of location specific geographical descriptive data;
   obtaining location data relating to the position of the device;
   retrieving geographical descriptive data specific to an indoor region from the database, the indoor region being selected dependent on the location data;
   subsequently estimating the position of the device taking into account the retrieved data;
   predicting one or more possible future positions of the device using the retrieved data;
   comparing the one or more predicted future positions of the device with a provisional estimated position of the device to determine whether the provisional estimated position of the device matches one of the predicted possible future positions; and
   adjusting the provisional estimated position of the device to match one of the predicted possible future positions.

2. A method of estimating the position of a device according to claim 1, wherein the location data comprises a provisional estimated position of the device.

3. A method of estimating the position of a device according to claim 1 wherein the retrieved data comprises layout data describing the spatial relationship between two or more physical features within the indoor region.

4. A method of estimating the position of a device according to claim 3 wherein the layout data comprises at least part of a floorplan of the indoor region or data derived therefrom.

5. A method of estimating the position of a device according to claim 1, wherein the retrieved data comprises topological information identifying passable and impassable sections within the indoor region.

6. A method of estimating the position of a device according to claim 1, wherein the retrieved data comprises one or more constraints defining possible and impossible positions of the device within the indoor region.

7. A method of estimating the position of a device according to claim 1, wherein the retrieved data comprises one or more paths, each path defining a range of possible positions of the device along a respective route within the indoor region.

8. A method of estimating the position of a device according to claim 1 wherein the retrieved data comprises positions of one or more topological features and one or more predefined zones, each zone being associated with a respective one of the topological features.

9. A method of estimating the position of a device according to claim 8 further comprising: determining whether an estimated position of the device is within one of the predefined zones; and, in response to a determination that the estimated position of the device is within one of the predefined zones, activating the execution of a pattern recognition algorithm associated with the topological feature associated with the predefined zone.

10. A method of estimating the position of a device according to claim 9 further comprising: in response to a determination that the estimated position of the device is within said one of the predefined zones providing one or more reference patterns associated with the topological feature associated with said one of the predefined zones to a positioning system module.

11. A method of estimating the position of a device according to claim 9, wherein the pattern recognition algorithm comprises: comparing movement of the device to one or more reference movement patterns to determine whether the device has passed through or interacted with the topological feature associated with the predefined zone; and adjusting the provisional estimated position of the device in response to a determination that the device has passed through or interacted with the topological feature.

12. A method of estimating the position of a device according to claim 9, wherein the pattern recognition algorithm is a turning point detection algorithm.

13. A method of estimating the position of a device according to claim 9, wherein the pattern recognition algorithm is a floor-change detection algorithm.

14. A method of estimating the position of a device according to claim 9, further comprising deactivating an execution of the pattern recognition algorithm in response to a determination that the estimated position of the device is outside of the predefined zone.

15. A method of estimating the position of a device according to claim 8 further comprising activating and/or deactivating one or more positioning algorithms and/or positioning systems or part thereof in response to a determination that the device has entered and/or left one of the predefined zones.

16. A method of estimating the position of a device according to claim 1, wherein the retrieved data defines a plurality of subregions within the indoor region.

17. A method of estimating the position of a device according to claim 1, wherein the indoor region comprises the interior of a building.

18. A method of estimating the position of a device according to claim 1 further comprising: obtaining second location data relating to an updated position of the device; retrieving geographical descriptive data specific to a second indoor region from the database, the second indoor region being selected dependent on the second location data; and subsequently estimating the position of the device taking into account the retrieved data concerning the second indoor region.

19. Data processing apparatus comprising:
a geographical descriptive data processing module in communication with a database of location specific geographical descriptive data, the geographical descriptive data processing module being configured to:
  select an indoor region dependent on location data relating to the position of a device;
  retrieve geographical descriptive data specific to the indoor region from the database;
  subsequently estimate a position of the device taking into account the retrieved data and/or to output data from the retrieved data or data derived from the retrieved data which is usable for estimating a position of the device;
  predict one or more possible future positions of the device using the retrieved data;
  compare the one or more predicted future positions of the device with a provisional estimated position of the device to determine whether the provisional estimated position of the device matches one of the predicted possible future positions; and
  adjust the provisional estimated position of the device to match one of the predicted possible future positions.

20. Data processing apparatus according to claim 19 further comprising a computer readable storage medium storing the database.

21. Data processing apparatus according to claim 19 wherein the retrieved data or data derived therefrom comprises topological information identifying passable and impassable sections within the indoor region.

22. Data processing apparatus according to claim 19 wherein the retrieved data comprises one or more constraints defining possible and impossible positions of the device within the indoor region.

23. Data processing apparatus according to claim 19 wherein the retrieved data comprises one or more paths, each path defining a range of passable positions along a respective route within the indoor region.

24. Data processing apparatus according to claim 19 wherein the retrieved data comprises positions of one or more topological features.

25. Data processing apparatus according to claim 24 wherein the topological information further comprises one or more predefined zones, each zone being associated with one of the topological features.

26. Data processing apparatus according to claim 25 wherein the geographical descriptive data processing module is further configured to determine whether an estimated position of the device is within one of the predefined zones and, in response to a determination that the estimated position of the device is within one of the predefined zones, to activate the execution of a pattern recognition algorithm associated with the topological feature associated with the predefined zone.

27. Data processing apparatus according to claim 26 wherein the geographical descriptive data processing module is further configured to, in response to a determination that the estimated position of the device is within said one of the predefined zones, retrieve one or more reference patterns associated with the topological feature associated with said one of the predefined zones from the database.

28. Data processing apparatus according to claim 26 wherein the geographical descriptive data processing module is further configured to deactivate the pattern recognition algorithm(s) in response to a determination that the estimated position of the device is outside of the predefined zone.

29. Data processing apparatus according to claim 25 wherein the geographical descriptive data processing module is further configured to activate and/or deactivate execution of one or more positioning algorithms and/or positioning systems or part thereof in response to a determination that the device has entered and/or left one of the predefined zones.

30. Data processing apparatus according to claim 19 wherein the retrieved data or data derived therefrom defines a plurality of subregions within the indoor region.

31. Data processing apparatus according to claim 19 wherein the indoor region comprises the interior of a building.

32. Data processing apparatus according to claim 19 wherein the geographical descriptive data processing module is configured to: select a second indoor region dependent on second location data relating to an updated position of the device; retrieve geographical descriptive data specific to the second indoor region from the database; and to subsequently estimate a second position of the device taking into account the retrieved data specific to the second indoor region and/or to output data from the retrieved data or data derived therefrom specific to the second indoor region data which can be used to estimate a second position of the device.

33. Data processing apparatus according to claim 19 further comprising a positioning system module for estimating the position of a device, the positioning system module being in communication with the geographical descriptive data processing module.

34. Data processing apparatus according to claim 33 wherein the positioning system module is configured to transmit location data to the geographical descriptive data processing module, and wherein the geographical descriptive data processing module is configured to provide the positioning system module with data from the retrieved data or data derived therefrom.

35. Data processing apparatus according to claim 33, wherein the positioning system module is configured to perform the pattern recognition algorithm(s).

36. Data processing apparatus according to claim 35 wherein the geographical descriptive data processing module is configured to transmit a reference movement pattern to the positioning system module in response to a determination that the estimated position of the device is within a said predefined zone.

37. Data processing apparatus according to claim 36 wherein the pattern recognition algorithm comprises: comparing movement of the device to the reference movement pattern to determine whether the device has passed through or interacted with the topological feature associated with the reference movement pattern.

38. Data processing apparatus according to claim 37 wherein the geographical descriptive data processing module is configured to adjust the estimated position of the device taking into account the retrieved data in response to a determination that the device has passed through or interacted with the topological feature.

39. Data processing apparatus according to claim 26 wherein the pattern recognition algorithm comprises a turning point detection algorithm.

40. Data processing apparatus according to 26 wherein the pattern recognition algorithm comprises a floor-change detection algorithm.

41. A method of estimating the position of a device, the method comprising:
- providing a database of location specific geographical descriptive data;
- obtaining location data relating to the position of the device;
- retrieving geographical descriptive data specific to an indoor region from the database, the indoor region being selected dependent on the location data; and
- subsequently estimating the position of the device taking into account the retrieved data, wherein the method comprises:
- retrieving one or more reference movement patterns, which are specific to the indoor region, from the database;
- comparing movement of the device to the one or more reference movement patterns retrieved from the database to determine whether the device has passed through or interacted with a topological feature; and
- adjusting an estimated position of the device in response to a determination that the device has passed through or interacted with the topological feature, wherein the reference movement patterns are representative of successive movements expected by the device when it passes through or interacts with the topological feature.

42. Data processing apparatus comprising a computer processor, the data processing apparatus being configured to:
- provide a database of location specific geographical descriptive data;
- provide location data relating to the position of a device;
- retrieve geographical descriptive data specific to an indoor region from the database, the indoor region being selected dependent on the location data;
- subsequently estimate the position of the device taking into account the retrieved data;
- retrieve one or more reference movement patterns, which are specific to the indoor region, from the database;
- compare movement of the device to the one or more reference movement patterns retrieved from the database to determine whether the device has passed through or interacted with a topological feature; and
- adjust an estimated position of the device in response to a determination that the device has passed through or interacted with the topological feature, wherein the reference movement patterns are representative of successive movements expected by the device when it passes through or interacts with the topological feature.

43. A method of estimating the position of a device, the method comprising:
- providing a database of location specific geographical descriptive data;
- obtaining location data relating to the position of the device;
- retrieving geographical descriptive data specific to an indoor region from the database, the indoor region being selected dependent on the location data;
- subsequently estimating the position of the device taking into account the retrieved data;
- predicting one or more possible future positions of the device;
- comparing the one or more predicted future positions of the device with a provisional estimated position of the device to determine whether the provisional estimated position of the device matches one of the predicted possible future positions; and
- adjusting the provisional estimated position of the device to match one of the predicted possible future positions.

* * * * *